United States Patent
Hayes et al.

(10) Patent No.: US 10,735,052 B2
(45) Date of Patent: Aug. 4, 2020

(54) COMMUNICATION SYSTEMS FOR PATIENT SUPPORT APPARATUSES

(71) Applicant: Stryker Corporation, Kalamazoo, MI (US)

(72) Inventors: Michael Joseph Hayes, Kalamazoo, MI (US); Adam Darwin Downey, Kalamazoo, MI (US); Aaron Douglas Furman, Kalamazoo, MI (US); Krishna Sandeep Bhimavarapu, Kalamazoo, MI (US); Jonathan Mark Greenbank, Plainwell, MI (US)

(73) Assignee: Stryker Corporation, Kalamazoo, MI (US)

( * ) Notice: Subject to any disclaimer, the term of this patent is extended or adjusted under 35 U.S.C. 154(b) by 283 days.

(21) Appl. No.: 15/959,873

(22) Filed: Apr. 23, 2018

(65) Prior Publication Data

US 2018/0241434 A1 Aug. 23, 2018

Related U.S. Application Data

(63) Continuation of application No. 13/802,992, filed on Mar. 14, 2013, now Pat. No. 9,966,997.
(Continued)

(51) Int. Cl.
*H04B 5/00* (2006.01)
*A61G 7/05* (2006.01)
(Continued)

(52) U.S. Cl.
CPC ........... *H04B 5/0031* (2013.01); *A61G 7/018* (2013.01); *A61G 7/05* (2013.01); *A61G 7/0506* (2013.01);
(Continued)

(58) Field of Classification Search
CPC .. H04B 5/0031; H04B 5/0037; H04B 5/0093; H04B 5/02; A61G 7/0506; A61G 7/018;
(Continued)

(56) References Cited

U.S. PATENT DOCUMENTS 5,771,511 A * 6/1998 Kummer ................ A61G 7/015
5/600
7,598,853 B2 * 10/2009 Becker .................. A61B 5/1113
340/539.13
(Continued)

*Primary Examiner* — David R Hare
(74) *Attorney, Agent, or Firm* — Warner Norcross + Judd LLP

(57) ABSTRACT

A patient support apparatus, such as a bed, cot, stretcher, or the like, uses the ability to communicate with a device via near field communication to determine that the device is physically proximate the support apparatus. The support apparatus uses this determination to associate itself with the device. In some instances, the associated device is a mattress positioned on the support apparatus; a footboard on the support apparatus; a medical device used with a patient supported on the support device; a nearby piece of furniture; another patient support apparatus; or an ID tag worn by a caregiver or patient, or attached to a piece of equipment. After the support apparatus and device are associated, they communicate information between each other using far field communication, which supports higher data transfer rates. Flux concentrators are added in some embodiments to extend and/or shape the range of near the field communication.

21 Claims, 19 Drawing Sheets

Related U.S. Application Data

(60) Provisional application No. 61/701,943, filed on Sep. 17, 2012.

(51) Int. Cl.
*H04B 5/02* (2006.01)
*A61G 7/018* (2006.01)

(52) U.S. Cl.
CPC ......... *H04B 5/0037* (2013.01); *H04B 5/0093* (2013.01); *H04B 5/02* (2013.01)

(58) Field of Classification Search
CPC .. A61G 7/05; A61G 2203/12; A61G 2203/46; G06F 19/32
See application file for complete search history.

(56) References Cited

U.S. PATENT DOCUMENTS

| | | | | |
|---|---|---|---|---|
| 9,320,662 | B2* | 4/2016 | Hayes | A61G 7/002 |
| 9,838,836 | B2* | 12/2017 | Hayes | G06Q 50/22 |
| | | | | 705/3 |
| 9,966,997 | B2* | 5/2018 | Hayes | G07C 1/10 |
| | | | | 702/188 |
| 2002/0183979 | A1* | 12/2002 | Wildman | G07C 1/10 |
| | | | | 702/188 |
| 2005/0035862 | A1* | 2/2005 | Wildman | G07C 9/28 |
| | | | | 340/573.1 |
| 2005/0093709 | A1* | 5/2005 | Franco, Jr. | A61B 5/1112 |
| | | | | 340/686.1 |
| 2006/0058587 | A1* | 3/2006 | Heimbrock | A61B 6/0457 |
| | | | | 600/300 |
| 2007/0210917 | A1* | 9/2007 | Collins, Jr. | A61G 7/018 |
| | | | | 340/539.1 |
| 2009/0112630 | A1* | 4/2009 | Collins, Jr. | G06F 19/3418 |
| | | | | 705/3 |
| 2009/0214009 | A1* | 8/2009 | Schuman, Sr. | G08B 25/00 |
| | | | | 379/106.02 |
| 2013/0135160 | A1* | 5/2013 | Dixon | H01Q 1/44 |
| | | | | 343/720 |
| 2014/0184409 | A1* | 7/2014 | Vanderpohl, III | A61G 7/05 |
| | | | | 340/539.22 |
| 2015/0081335 | A1* | 3/2015 | Dixon | G06Q 50/22 |
| | | | | 705/3 |

\* cited by examiner

COMMUNICATION SYSTEMS FOR PATIENT SUPPORT APPARATUSES

CROSS-REFERENCE TO RELATED APPLICATIONS

This application is a continuation of U.S. patent application Ser. No. 13/802,992, filed Mar. 14, 2013, which claims priority to U.S. patent application Ser. No. 61/701,943 filed Sep. 17, 2012 by applicants Michael Joseph Hayes et al. and entitled COMMUNICATION SYSTEMS FOR PATIENT SUPPORT APPARATUSES, the complete disclosures of which are hereby incorporated herein by reference.

BACKGROUND OF THE INVENTION

The present invention relates to patient support apparatuses—such as, but not limited to, beds, cots, stretchers, chairs, operating tables, and the like—and more particularly to wireless communication systems for such patient support apparatuses.

Patient support apparatuses are generally assigned to a specific patient while the patient stays in the hospital or other healthcare facility. While the patient is assigned to a particular support apparatus, there are often one or more medical devices that are used in the treatment of that individual. Such medical devices often generate information that is usefully recorded in that particular patient's medical records, or otherwise forwarded to the caregivers. In order for that information to get into the right person's medical records, there must be an association that is made between that particular patient and that particular medical device. In other words, either the medical device itself, or the computer device receiving the information from the medical device, must be configured to match the data it is generating with the particular patient for whom the medical device is being used to treat. In the past, this association of medical devices to specific patients could be a time consuming process, particularly where there are multiple such medical devices being used.

In addition to medical devices, there are other situations in a healthcare setting where it is desirable to associate one electronic device with another electronic device, or an electronic device with a caregiver, or other object. Such situations arise frequently, but not exclusively, where the electronic devices communicate wirelessly. Because wireless communication often has a range that will encompass relatively large areas, a first device that sends out RF signals to a second device may receive responses from multiple ones of the second device—some of which may be in the same room, and others which may be in different rooms or other locations within the healthcare facility. In such cases, it may not be possible for the first device to determine which of the multiple second devices, if any, it should be associated with.

In still other situations, regardless of any association or lack of association between a patient support apparatus and another device, patient support apparatuses may include one or more electrical actuators and/or controllers that need to communicate with each other, and/or to communicate with objects that are either spaced from the patient support apparatus, or that are designed to be removable from the patient support apparatus. Often times this type of communication is carried out by wired connections. In some instances, however, there are disadvantages to using wired communications. Still further, there may be disadvantages, such as undue power consumptions and/or interference issues with using conventional wireless communication.

SUMMARY OF THE INVENTION

In general, the present invention relates to improved communication systems for patient support apparatuses. In some embodiments, the improved communications assist in the ability of one device to associate itself with another device, and/or for one device to determine its location within a healthcare facility. In many embodiments, the improved communications are wireless communications, although the improved communications are not exclusive to wireless. In some embodiments, near field communications are used as a proxy for determining associations amongst wirelessly communicating devices due to the limited physical range of the near field communications. In other words, if two devices are able to communicate with each other using near field communication, they must be located within a certain relatively close range, and given that close range, a determination can be made as to whether the devices are likely associated with each other or not. In still other embodiments, far field communication is incorporated into the patient support apparatus, either alone or in combination with the near field communication, and used for determining associations and/or for communicating data at a rate higher than what is possible using near field communications.

In still other embodiments, near field communication is used to wirelessly communicate between two components, one or both of which may be located on a patient support apparatus. Such near field communication is especially useful where wired communications between the two components may be undesirable for one or more reasons. In still other embodiments, near field communications between the patient support apparatus and the intended recipient—whether located on the patient support apparatus or elsewhere—is improved through the use of one or more flux concentrators that concentrate the magnetic flux lines near one or both of the communicating transceivers, thereby increasing the range of the near field communications and/or reducing the power consumption required for the near field communications.

According to one embodiment, a patient support apparatus is provided that includes a patient support deck, a controller, a near field communication transceiver, and a far field communication transceiver. The patient support deck is adapted to support a patient thereon. The controller is adapted to control at least one aspect of the patient support apparatus. The near field and far field communication transceivers are adapted to both be able to communicate with the same device.

According to another embodiment, a patient support apparatus is provided that includes a patient support deck, a near field communications transceiver, and a controller. The support deck is adapted to support a patient thereon. The near field communication transceiver is adapted to communicate with a device if the device is positioned within a near field vicinity of the near field communication transceiver. The controller communicates with the near field communication transceiver, and is adapted to associate the patient support apparatus and the device if the near field communication transceiver is able to communicate with the device.

According to still another embodiment, a method of associating a patient support apparatus with a device is provided. The method includes transmitting a message from the patient support apparatus to the device using a near field communications transceiver; receiving a response from the device if the device is within range of the near field communications transceiver; and associating the device with the patient support apparatus if a response is received by the near field communications transceiver from the device.

According to still another embodiment, a patient support apparatus is provided that includes a patient support deck, a first near field communication transceiver, and a second near field communication transceiver. The patient support deck is adapted to support a patient thereon. The first near field communication transceiver is positioned at a first location on the patient support apparatus. The second field communication transceiver is positioned at a second location on the patient support apparatus wherein the first and second near field communication transceivers are adapted to communicate with each other using near field communication.

According to yet another embodiment, a patient support apparatus is provided that includes a patient support deck, a near field communications transceiver, and a flux concentrator. The near field communications transceiver is positioned at a first location on the patient support apparatus, and the flux concentrator is positioned adjacent to the near field communication transceiver.

According to still other aspects, the controller in any of the above embodiments may be adapted to communicate with the device first using a near field communication transceiver and second using a far field communication transceiver. No association is made between the patient support apparatus and a device if the near field communications transceiver is not able to establish communication with the device, despite the fact that a far field communications transceiver is able to establish communication with the device.

The device with which the near field communications transceiver communicates may be any one or more of a mattress positioned on the patient support deck, a pendant positioned on the patient support apparatus, a medical device associated with a patient supported on the patient support apparatus, a piece of furniture, a footboard on the patient support apparatus, a portable computing device that may be transported by authorized personnel, a brake on the patient support apparatus, a swivel lock actuator for locking and unlocking a swiveled caster wheel on the patient support apparatus, a lift for raising and lowering a patient support deck of a cot, or still other structures.

In those instances where one or more flux concentrators are used in conjunction with the near field communications, the flux concentrator may be a resonant antenna. The flux concentrator(s) may be positioned between the near field communication transceivers, or in some cases, they are positioned adjacent to one or more of the transceivers, but not necessarily between the two. In some embodiments, a controller is included that turns on and off one or more of the flux concentrators. The controller turns on and off the flux concentrators in any one or more of several different manners, such as: opening and closing a circuit within the flux concentrator, changing an orientation of the flux concentrator relative to the near field communications transceiver, changing a gap between a pair of resonant antennas, and sliding one or both of a pair of parallel resonant antennas to different positions in parallel planes. In still other instances, there are up to three or more near field communication transceivers on the patient support apparatus, and in such cases three or more flux concentrators may be used. Depending upon the specific embodiment, a flux concentrator may be integrated into a cover of a mattress positioned on the patient support apparatus, particularly in those embodiments where a controller inside of the mattress communicates with a component external to the mattress via near field communication.

The patient support apparatus may be one of a bed, a stretcher, a cot, a recliner, an operating table, a chair, or other structure adapted to allow a patient to sit or lie thereon. In some embodiments, the patient support apparatus includes a base having a plurality of wheels, a height adjustment mechanism for raising and lowering the support deck with respect to the base, and a plurality of side rails positioned along respective sides of the patient support deck. The side rails, in some embodiments, are movable between a raised and a lowered position.

In some embodiments, a controller on the patient support apparatus forwards data to a location remote from the support apparatus that indicates the association between the support apparatus and the device, or that includes other data related to either the patient support apparatus or the device itself. The data is forwarded wirelessly using a far field communications transceiver. The recipient of the data may be a healthcare computer network, such as, but not limited to, an Ethernet. The far field communications transceiver may be the same or different from a far field communications transceiver that, in some embodiments, also communicates with the device. The far field communications transceiver may be a WIFI device (IEEE 802.11) that forwards the data to the healthcare computer network. The data forwarded by the patient support apparatus to the healthcare network, in some instances, includes data indicative of the location of the patient support apparatus and/or the device.

A controller on the patient support apparatus may further be configured to determine an identity of the device by communicating with it through either near field or far field communication transceivers. One or more displays may be included on the patient support apparatus that display the identity of the device and/or information indicating the association between the device and the patient support apparatus. A user input device—such as, but not limited to, a keypad, one or more buttons, a touch screen, one or more switches, or the like—is included on the patient support apparatus and adapted to allow a user to either accept a displayed association with the device or to override the displayed association.

In some embodiments, the patient support apparatus will include multiple near field communication transceivers. In some of such embodiments, one of the near field communications transceivers is positioned on a first side of the patient support apparatus while the other of the near field communications transceivers is positioned on a second side of the patient support apparatus opposite the first side. In such embodiments, the patient support apparatus may communicate via near field communications with an adjacent bed, stretcher, chair, cot, or other patient support apparatus, or it may communicate with a medical device positioned alongside the patient support apparatus, or it may communicate with an RF ID tag worn by a caregiver or attached to a device, or it may communicate with still other devices.

The patient support apparatus may further be configured to communicate information to the device using either the near field communications transceiver, or a far field communications transceiver (if so equipped). Such information may include an ID of the patient support apparatus. Alternatively, or in addition thereto, the information may include information about the patient being supported on the patient support apparatus. Still further, the information may include information that identifies the room in which the patient support apparatus is located, and/or a bay within the room, or includes information enabling the device to determine its room location and/or bay location within the healthcare facility.

In some embodiments, the first near field communications transceiver is incorporated into a frame or footboard of the patient support apparatus while the second near field communications transceiver is incorporated into a mattress supportable on the frame. Both the mattress and the frame or footboard further include far field communication transceivers that enable higher speed communications to take place between the two. In some embodiments, the mattress further includes an inductive power coil positioned at a location thereon to align with another inductive power coil on the frame whereby the inductive power coil on the frame is adapted to inductively transfer electrical power to the mattress. In such embodiments, the mattress is controllable and powerable without any electrical wires connecting it to the frame, the footboard, a pendant, or any other structures.

In any one of the embodiments in which an association is established between the patient support apparatus and another device, the support apparatus and device may subsequently communicate intermittently or periodically to reconfirm the association. If such subsequent communications are unsuccessfully completed, the association is discontinued, or a warning is issued indicating the unsuccessful communications.

A control panel is included on the patient support apparatus that, in some embodiments, is in wired communication with a first near field communications transceiver. An actuator is also included on the patient support apparatus that is in wired communication with a second near field communications transceiver. In such embodiments, the first near field communication transceiver is adapted to transmit a command to the second near field communication transceiver based upon manipulation of the control panel, and the second near field communication transceiver is adapted to forward information related to the command to the actuator whereby the actuator is controllable via the control panel without any wired connection between the control panel and the actuator. The control panel may be removable from said patient support apparatus in some embodiments. In other embodiments, the control panel is incorporated into a footboard or into a pendant. In other embodiments, the control panel is positioned at the front end of the patient support apparatus, and the patient support apparatus is a cot. The actuator may be adapted to change a height of the patient support deck, or to control a brake for at least one wheel of the patient support apparatus, or to lock and unlock at least one swivel caster wheel on the patient support apparatus.

According to yet another embodiment, a patient support apparatus is provided that includes a base, a frame supported on the base, a patient support deck adapted to support a patient thereon, first and second transceivers, and a controller. The first transceiver communicates with a device using a first communication protocol having a first data transfer rate, and the second transceiver communicates with the device using a second communication protocol having a second data transfer rate that is higher than the first data transfer rate. The controller controls the first and second transceivers such that the patient support apparatus communicates with the device using both the first and second communication protocols.

According to further aspects, the controller communicates with the device initially using the first communication protocol. The controller repetitively communicates with the device using the first communication protocol to verify the continued nearby physical presence of the device. The controller stops communicating with the device using the second communication protocol if the patient support apparatus is no longer able to communicate with the device using the first communication protocol. The second communications protocol is Bluetooth or Zigbee. The first communication protocol follows standard ISO/IEC 18092. The patient support apparatus is a bed, stretcher, or cot.

Before the various embodiments of the invention are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE EMBODIMENTS

Figure 1:
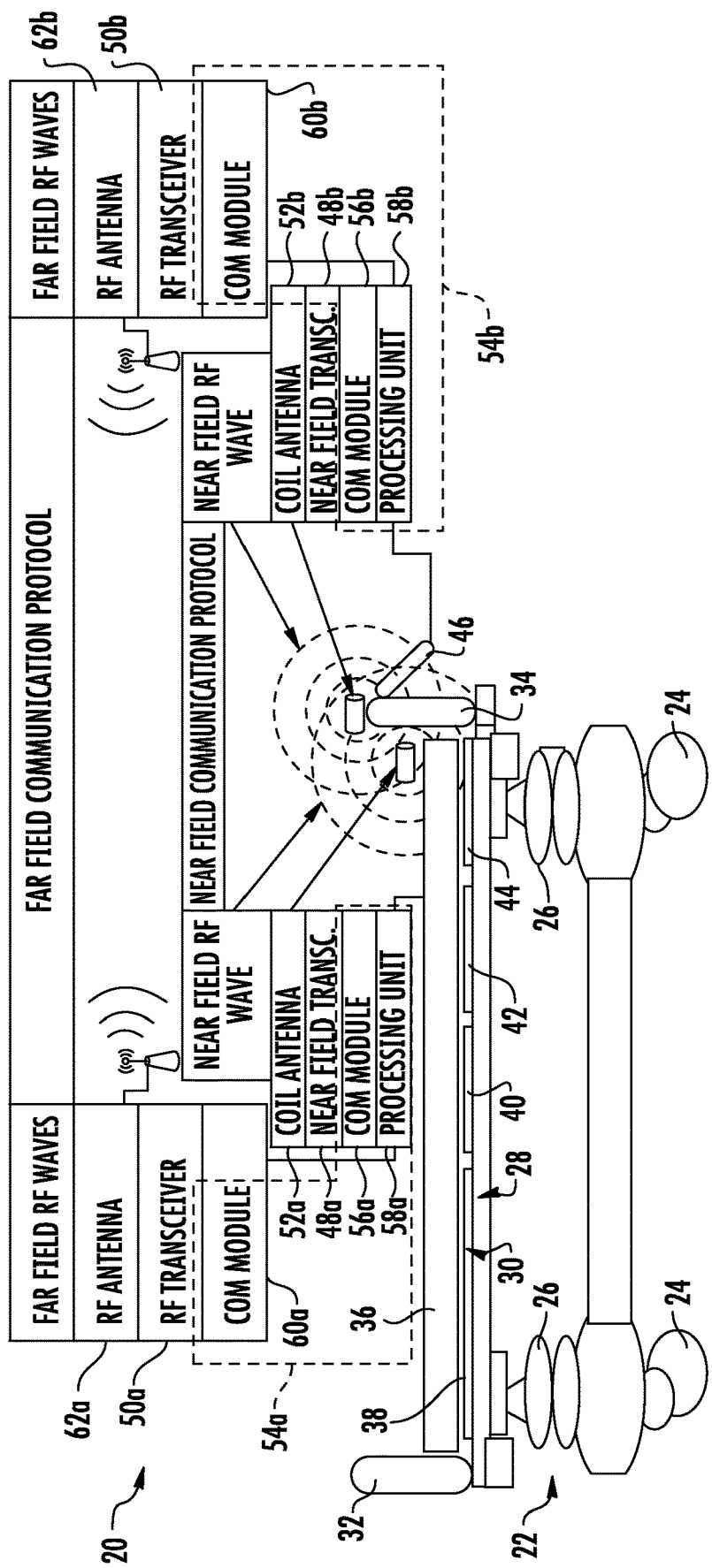
FIG. 1 is side elevation view of a patient support apparatus according to a first embodiment.

A patient support apparatus 20 according to a first embodiment is shown in FIG. 1. In this embodiment, patient support apparatus is a bed intended for use in a healthcare facility, such as a hospital or the like. In other embodiments, patient support apparatus 20 may be a cot, a stretcher, a chair, a recliner, an operating table, or other structure that is used to support a patient in a healthcare setting.

In general, patient support apparatus 20 includes a base 22 having a plurality of wheels 24, a pair of elevation adjustment mechanisms 26 supported on said base, a frame or litter 28 supported on said elevation adjustment mechanisms, and a patient support deck 30 supported on said frame. Patient support apparatus 20, in some embodiments, also includes a headboard 32 and a footboard 34. Either or both of headboard 32 and footboard 34 are removable from frame 28 and may include one or more electrical connectors for establishing electrical communication between electronic components on or in footboard 34 and/or headboard 32 and other electronic components support on or in frame 28. Such electrical connector(s) may include any one or more of the connectors disclosed in commonly assigned U.S. patent application Ser. No. 61/692,256, filed Aug. 23, 2012, by applicants Krishna Bhimavarapu et al. and entitled PATIENT SUPPORT APPARATUS CONNECTORS, the complete disclosure of which is incorporated herein by reference. Other types of connectors may also be used.

Elevation adjustment mechanisms 26 are adapted to raise and lower frame 28 with respect to base 22. Elevation adjustment mechanisms 26 may be implemented as hydraulic actuators, electric actuators, or any other suitable device for raising and lowering frame 28 with respect to base 22. In some embodiments, elevation adjustment mechanisms 26 are operable independently so that the orientation of frame 28 with respect to base 22 may also be adjusted.

Frame 28 provides a structure for supporting patient support deck 30, headboard 32, and footboard 34. Patient support deck 30 is adapted to provide a surface on which a mattress 36, or other soft cushion, is positionable so that a patient may lie and/or sit thereon. Patient support deck 30 is made of a plurality of sections, some of which are pivotable about generally horizontal pivot axes. In the embodiment shown in FIG. 1, patient support deck 30 includes a head section 38, a seat section 40, a thigh section 42, and a foot section 44. In other embodiments, patient support deck 30 may include fewer or greater numbers of sections. Head section 38, which is also sometimes referred to as a Fowler section, is pivotable between a generally horizontal orientation (shown in FIG. 1) and a plurality of raised positions (not shown in FIG. 1). Thigh section 42 and foot section 44 may also be pivotable about horizontal pivot axes.

A plurality of side rails 45 (FIGS. 7 and 9) may also be coupled to frame 28. If patient support apparatus 20 is a bed, there will often be four such side rails, one positioned at a left head end of frame 28, a second positioned at a left foot end of frame 28, a third positioned at a right head end of frame 28, and a fourth positioned at a right foot end of frame 28. If patient support apparatus 20 is a stretcher or a cot (an example of a cot being shown in FIGS. 8 and 10), there will often be fewer side rails. In other embodiments, there may be no side rails on patient support apparatus 20. Regardless of the number of side rails, such side rails are movable between a raised position in which they block ingress and egress into and out of patient support apparatus 20, and a lowered position in which they are not an obstacle to such ingress and egress.

The general construction of any of base 22, elevation adjustment mechanisms 26, frame 28, patient support deck 30, headboard 32, and/or footboard 34 may take on any known or conventional design, such as, for example, that disclosed in commonly assigned, U.S. Pat. No. 7,690,059 issued to Lemire et al., and entitled HOSPITAL BED, the complete disclosure of which is incorporated herein by reference; or that disclosed in commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosure of which is also hereby incorporated herein by reference. The construction of any of base 22, elevation adjustment mechanisms 26, frame 28, patient support deck 30, headboard 32, footboard 34 and/or the side rails may also take on forms different from what is disclosed in the aforementioned patent and patent publication.

In some embodiments, mattress 36 is an inflatable mattress that includes one or more air bladders that are selectively inflatable to different levels of inflation. One such powered mattress is disclosed in commonly-assigned U.S. patent application Ser. No. 13/022,326 filed Feb. 7, 2011 by applicants Lafleche et al. and entitled PATIENT/INVALID HANDLING SUPPORT, the complete disclosure of which is incorporated herein by reference. In other embodiments, the powered mattress is the same or similar to those disclosed in commonly assigned U.S. pat. application Ser. No. 61/696,819 filed Sep. 5, 2012 by applicants Patrick Lafleche et al. and entitled INFLATABLE MATTRESS AND CONTROL METHODS, and/or commonly assigned U.S. Pat. application Ser. No. 61/697,010 filed Sep. 5, 2012 by applicants Patrick Lafleche et al. and entitled PATIENT SUPPORT, the complete disclosures of both of which are also hereby incorporated herein by reference.

Other types of powered mattresses are also usable with patient support apparatus 20. Regardless of the specific type of mattress used with patient support apparatus 20, it is desirable is some embodiments to be able to control the mattress 36 through a user interface 46 that is positioned on footboard 34. Further, in order to avoid the labor of connecting a physical wire, cable, or other structure between user interface 46 and mattress 36, patient support apparatus 20 is configured to enable wireless communication between footboard 34 (more specifically user interface 46) and mattress 36. This wireless communication will be described in greater detail below.

Before turning to the wireless communication between mattress 36 and user interface 46, it should be pointed out that, in some embodiments, mattress 36 can be configured to also receive electrical power wirelessly from frame 28. Such wireless power transfer can be carried out through inductive coupling between mattress 36 and frame 28, or by other means. By delivering electrical power wirelessly to mattress 36, as well as by controlling mattress 36 wirelessly, it is possible to avoid having to make any wire, cable, or other physical connections between mattress 36 and any of the components patient support apparatus 20 (e.g. frame 28, footboard 34, or other components). This eliminates the possibility of wire or cable damage that would otherwise exist due to a person inadvertently trying to separate the mattress 36 from the rest of patient support apparatus 20 without remembering to first disconnect such a wire or cable connection. The wireless supply of electrical power to mattress 36 from frame 28 may be carried out in a variety of manners, including, but not limited to, those disclosed in commonly assigned, U.S. patent application Ser. No. 13/296,656 filed Nov. 15, 2011 by applicants Lemire et al. and entitled PATIENT SUPPORT WITH WIRELESS DATA AND/OR ENERGY TRANSFER, the complete disclosure of which is incorporated herein by reference. In other embodiments, footboard 34 wirelessly communicates with mattress 36 while electrical power is delivered to mattress 36 via a wired connection.

In the embodiment shown in FIG. 1, mattress 36 and footboard 34 communicate with each other wirelessly using two different wireless communication protocols: a far field communications protocol and a near field communications protocol. The terms "near field" and "far field" are terms commonly understood in the field of electrical engineering and physics. Generally speaking, far field communication refers to communication that takes place using electromagnetic waves wherein the electromagnetic fields are dominated by electric and magnetic fields produced from the changes in each other (i.e. the electric field generated by a changing magnetic field, and vice versa), while near field communication refers to communication that takes place where the electromagnetic fields are dominated by electric and magnetic fields produced by charge-separations and electrical current, respectively. The near field electromagnetic components tend to decay in amplitude the farther the distance from the source in a manner that is much faster than the decay for the far field components. The far field communications protocol may be any conventional far field communication protocol.

The particular near field communications protocol used by patient support apparatus 20 varies in different embodiments. In one embodiment, the near field communications protocol follows the standard 18092 of the International Organization for Standards (ISO) and International Electrotechnical Commission (IEC), also known as ISO/IEC 18092. Other standards that may be used include anything based on existing radio-frequency identification (RFID) standards, such as ISO/IEC 14443. In still other embodiments, any protocols that use, or are based on, any of the near field communication standards promulgated by the NFC Forum, a non-profit organization that promotes the use of wireless interaction in consumer electronic devices and which has a place of business in Wakefield, Mass., can be used. In still other embodiments, still different near field communication protocols are used.

The particular far field communications protocols used by patient support apparatus 20 also vary from one embodiment to another. Indeed, in some embodiments, multiple different types of far field communication transceivers are used on the same patient support apparatus. Such far field communication protocols include, but are not limited to, any one or more of the following: WiFi or IEEE 802.11, ZigBee or any communications based on the IEEE 802 standards, Bluetooth, and any other narrowband or ultra-wideband protocols.

Mattress 36 of patient support apparatus 20 (FIG. 1) includes a near field communications transceiver 48 that uses any one or more of the near field communication protocols listed above. Mattress 36 further includes a far field communications transceiver 50 that uses any of the far field communication protocols listed above. While FIG. 1 illustrates both near field and far field transceivers 48 and 50 as being located outside of mattress 36, it will be understood by those skilled in the art that this is merely for purposes of illustration. In actuality, both transceivers 48 and 50 will be positioned either inside the interior of mattress 36 where they will be invisible to a user of mattress 36, or they will be positioned along an edge—or otherwise coupled to mattress 36—at a location that will not interfere with a patient's use of mattress 36.

While any suitable location inside of, or adjacent to, mattress 36 may be selected for far field transceiver 50, near field transceiver 48 should be positioned at a location that is sufficiently near to the one or more near field transceivers it will be in communication with. In the embodiment of FIG. 1, near field transceiver 48 of mattress 36 is intended to communicate with a near field transceiver 48 positioned inside of, or adjacent to, footboard 34. Accordingly, near field transceiver 48 of mattress 36 should be positioned close enough to footboard 34 such that near field communications will be able to take place between the two transceivers 48. For purposes of a more clear description, the near field transceiver of mattress 36 will be referred to as near field transceiver 48a, while the near field transceiver of footboard 34 will be referred to herein as near field transceiver 48b.

Mattress 36 and footboard 34 each include a coil antenna 52a and 52b, respectively, that is in electrical communication with their respective transceivers 48a and 48b. That is, each transceiver 48a and 48b controls the voltage and/or current that is applied to their respective coil antenna 52a, 52b when transmitting, and detects the induced current and/or voltage that is generated from the near field radiation of the other coil antenna 52a, 52b. In this manner, bidirectional near field communication is able to take place between coils 52a and 52b.

A communications controller 54a is included within mattress 36 and includes a near field communications module 56a, a processing unit 58a, and a far field communications module 60a. Controller 54a oversees and coordinates both the near field and far field communications of mattress 36, as will be described in greater detail below. Far field communications module 60a is in electrical communication with far field transceiver 50a, which, in turn, is in electrical communication with a far field antenna 62a. In response to the electrical signals received from far field RF transceiver 50a, far field antenna 62a generates far field radio frequency electromagnetic waves that are transmitted to any one or more other far field antennas within range antenna of 62a. In the example of FIG. 1, the RF waves of antenna 62a are picked up by far field antenna 62b of footboard 34, although, as described in more detail below, such RF waves may be transmitted to other far field antennas. Antenna 62a is also adapted to receive far field RF waves from other antennas, such as, but not limited to, those transmitted from antenna 62b.

Footboard 34 includes corresponding electronics that are the same as, or similar to, those described above with respect to mattress 36. That is, footboard 34 includes a communications controller 54b having a processing unit 58b, a near field communications module 56b, and a far field communications module 60b. Processing unit 58b is in communication with both near field communications module 56b and far field communications module 60b. Near field communications module 56b is in electrical communication with near field transceiver 48b which, as noted, communicates with coil antenna 52b. Far field communications module 60b is in electrical communication with far field transceiver 50b, which controls the voltage and/or current applied to far field antenna 62b when information is being transmitted off of footboard 34, and which detects the voltage and/or current received by far field antenna 62b when information is being received from other far field antennas.

Processing units 58a and 58b, as well as transceivers 48a, 48b and communication modules 56a, 56b, 60a, 60b, are constructed of any electrical component, or group of electrical components, that are capable of carrying out the algorithms described herein. In many embodiments, processing units 58a, 58b, communications modules 56a, 56b, 60a, and 60b, and transceivers 48a, 48b, will be microprocessor based, although not all such embodiments need include a microprocessor. In general, processing units 58a, 58b, communications modules 56a, 56b, 60a, and 60b, and transceivers 48a, 48b will include any one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units.

Further, any of the other controllers 54 or transceivers 48, 50 described below may include the same components and/or be configured in the same manner. Further, any of controllers 54 or transceivers 48, 50 may be part of a multi-node controller, either as a single node, a portion of a node, or as a collection of multiple nodes. Thus, the term "controller" is used broadly to include not only single processing entities, but also groups of processing entities that are distributed over an internal network, such as a CAN, LonWorks, LIN, or other type of network. The term "controller" therefore refers to either a processing entity that is contained to a unitary location, or a processing entity that is distributed over multiple physical locations.

Each processing unit 58a and 58b determines whether to communicate information at any given time using near field communications or far field communications, or both. If information is to be communicated using near field communications, the processing unit 58 forwards the information to be transmitted to the respective near field communications module 56. If information is to be communicated using far field communications, the processing unit 58 forwards the information to be transmitted to far field communications module 60. The respective modules 56 and 60 then convert the information from processing unit 58 into the desired format and/or protocol which has been selected for near field and far field communication. Modules 56 and 60 control the operation of their respective transceivers 48 and 50, which, in conjunction with the associated antennas, enable the communication to take place.

In addition to overseeing communication and determining which one, or both, of near field and far field communication options to use at a given moment, processing units 58a and 58b will also, in some embodiments, oversee one or more of the operations of mattress 36 or footboard 34, respectively. Thus, for example, processing unit 58a of mattress 36 can control one or more aspects of the operation of mattress 36, such as the inflation or deflation of one or more bladders inside mattress 36, the monitoring of any one or more pressure sensors or other sensors inside of mattress 36, and/or the implementation of any one or more control algorithms used inside mattress 36. Similarly, processing unit 58b of footboard 34 can, in some embodiments, control one or more aspects of footboard 34, such as overseeing or controlling a user interface 46 that is positioned on footboard 34. User interface 46 includes any combination of buttons, switches, touch screens, lights, indicators, or other similar structures that enable a user to control various operations of patient support apparatus. By way of non-exhaustive examples, user interface 46 may include buttons, switches, or a touch screen that allow a user to raise and lower frame 28, pivot one or more of sections deck 30, control a bed exit system, weigh a patient positioned on deck 30, or perform still other functions. Processing unit 58b may carry out the control of any one or more of these functions, or it may be dedicated to controlling the near field and far field communication of footboard 34.

Controllers 54a and 54b are adapted to establish an association with each other that is, in one set of embodiments, based upon the ability of near field communication transceivers 48a and 48b to communicate with each other. By establishing this association, mattress 36 will know that it should communicate with the specific footboard 34 that is attached to the same patient support apparatus 20 upon which mattress 36 rests. Similarly, by knowing this association, footboard 34 will know that it should communicate with the mattress 36 supported on the support apparatus 20 to which footboard 34 is mounted. Were such associations not established, it would be theoretically possible for a second patient support apparatus positioned nearby to patient support apparatus 20 to interfere with the communications between mattress 36 and footboard 34. When such a nearby patient support apparatus included its own mattress and footboard, those components could mistakenly intercept and/or respond to messages from the other patient support apparatus that were not intended for it. In other words, because footboard 34 and mattress 36 are not in wired communication with each other, footboard 34 cannot be certain its wireless messages are being processed by the mattress 36 positioned on the same patient support apparatus 20 (as opposed to another mattress on a different patient support apparatus positioned nearby support apparatus 20), and vice versa, until an association is made between the footboard 34 and the mattress 36 that are on the same patient support apparatus 20.

Consequently, once patient support apparatus 20 has associated itself with the particular mattress 36 positioned thereon, far field communication between the two includes appropriate identifiers of each other so that far field communication between other devices (e.g. another patient support apparatus and its mattress that are positioned within the same room) will not be misinterpreted by patient support apparatus 20, or its associated mattress 36, as being intended for patient support apparatus 20, or its associated mattress 36. In other words, far field messages received from a non-associated device are ignored. Further, because most far field communication protocols, such as Bluetooth, WiFi, or the like, use spread spectrum frequency hopping, or other means for ensuring a lack of interference between nearby devices using the same communication protocol, patient support apparatus 20 will be able to communicate without interference via far field communications with its associated mattress simultaneously with far field communication that is taking place between a nearby second patient support apparatus and its associated mattress. Thus, for example, a hospital room can simultaneously have both a first patient support apparatus 20 wirelessly communicating with its associated mattress using far field communication and a second patient support apparatus 20 wirelessly communicating with its associated mattress using far field communication, and the messages between one patient support apparatus-mattress pairing will not be used by the other patient support apparatus-mattress pairing, nor will the messages electromagnetically interfere with each other.

Either or both of controllers 54a and 54b are adapted to automatically establish the association between mattress 36 and footboard 34 using near field communication transceivers 48a and 48b. Because near field communication has a limited range, either or both of these transceivers can initiate a communication that will only be detectable within a relatively small distance. In some instances, the small distance is on the order of 5-10 centimeters, although, as will be discussed in greater detail below, this range may be extendable in some situations—where an extended range is desirable—through the use of one or more flux concentrators, increased power, or through other techniques. In some embodiments, by positioning coils 52a and 52b at suitable locations on patient support apparatus 20, and by the appropriate control of the power applied to each of these coils, patient support apparatus 20 is designed so that if near field antenna 52a of mattress 36 transmits a near field message, only near field antenna 52b of footboard 34 will be in close enough range to detect and respond to the message. Similarly, in such embodiments, the choice of location and power control can be used to ensure that if near field antenna 52b of footboard 34 transmits a near field message, only near field antenna 52a of mattress 36 will be close enough to detect and respond to the message. Such design can be implemented even where another patient support apparatus is positioned with its footboard adjacent to footboard 34. In still other embodiments, it might be possible for a footboard 34 or mattress 36 to transmit a message using near field communication that is received by another coil positioned somewhere off of patient support apparatus 20 (e.g. by another support apparatus). In such cases, support apparatuses 20 can include additional features to ensure communication takes place among only the intended entities, such as, but not limited to, the use of unique identifiers, as will be discussed below.

In one sense, the limited range of near field communications enables controllers 54a and 54b to use physical distance as a proxy for association. That is, controllers 54a and 54b are able to safely conclude that they are associated with each other because it is very unlikely that any other near field transceivers that were intended to be associated together could be positioned within a sufficiently close vicinity to receive and/or send near field transmissions.

Both the near field and far field communication between mattress 36 and footboard 34 include messages containing information, or data fields, that uniquely identify the transmitter of the message. In one embodiment, the unique identification is a code that generically identifies the transmitter as either a mattress or a footboard, while in other embodiments it is a code that uniquely distinguishes the particular mattress 36 or footboard 34 from other mattresses 36 or footboards 34 equipped with near field communication abilities. Among other advantages to transmitting this unique identification information, controller 54a and 54b is able to ensure that they are not communicating with the wrong kind of object. In other words, if controller 54a of mattress 36 receives a message that includes an identifier which indicates the source of the message as something other than a footboard, then, in at least some embodiments, mattress 36 can ignore the message because it has been configured to only respond to controls from a footboard, rather than other objects that might be positioned within a near field vicinity of it.

Each controller 54 includes, or has access to, a list in memory that correlates the identification code of the message sender to a type of object (i.e. a list that identifies the codes as corresponding to a mattress, a footboard, or something else). The controller 54 is thereby able to determine whether the sender of any given message was a mattress, a footboard, or something else.

In order for controllers 54a and 54b to become associated with each other (e.g. to both know that they are on the same patient support apparatus 20), one of them sends an initial message. This initial message is picked up by any near field communication transceiver that is within a near field vicinity of the transmitting transceiver. As was noted above, support apparatus 20 is designed so that it will typically not be possible for another near field transceiver to be sufficiently close to receive this message, other than the intended recipient. As will be discussed in greater detail below, the prevention of near field communication with transceivers that are not on patient support apparatus can be implemented by, in addition to controlling power and location, the use of one or more flux concentrators that are positioned adjacent the transceiver 48 and which shield transmissions in one or more specific directions. By placing these flux concentrators at suitable locations, near field transmissions from unintended directions are reduced or eliminated. Such flux concentrators block these transmissions by using pairs of flux concentrators that are positioned at specific distances apart, or that are arranged at specific angles, or that are turned off, as will be discussed in greater detail below.

Once the initial message is transmitted by one of transceivers 48a or 48b, the other responds to the message with its identification, as well as any other useful information. If, for some reason, multiple responses are received from multiple transceivers due to there being multiple near field transceivers in proximity and the shielding is either lacking or insufficient, then the transceiver sending the initial message will determine the identity of the multiple responding devices and use that information, if possible, to determine which device it should be communicating with. For example, if a footboard controller 54b gets a response from another footboard controller positioned nearby, it will disregard that footboard because, in the example of FIG. 1, it is intended to talk to a mattress 36, not another footboard. If it is not possible to determine which device is the proper device for communication by this method, the transceiver 48 that transmitted the initial message will retransmit the initial message at a lower power, and therefore a smaller range. If multiple devices respond still, it will retransmit yet again at yet a lower power. This reduction in power of the initial transmission will continue until only one device responds. The last device that responds will therefore be presumed to be the closest device, and the controller will associate itself with that device.

Once the controller 54 that sent the initial message has associated itself with another controller for communication, subsequent communications will includes messages that identify the intended recipient and the transmitter. In this manner, any other near field device that may be in the vicinity will, if they happen to intercept the message, be able to determine that the message was not intended for them, and therefore ignore. Only the device that is the intended recipient of the message will respond to it.

Once a controller 54 has established near field communication with another controller 54, both controllers will continue to periodically or continuously communicate via near field communications with each other to repetitively verify that the association between the controllers 54 is still valid. However, in many situations, the data rates of the near field communications protocols are much smaller than those that are available for far field communications. Consequently, in many embodiments, once two devices have become associated with each other via near field communication, their respective controllers 54 will also begin to use far field communication (at least for transferring large amounts of data). The far field communication will enable them to transfer data at faster rates than if there were to continue to only use near field communication. The far field communication messages also include an identification of the intended recipient of each message so that, in the event another device receives the message (which is more likely, given the greater range of far field communications as compared to near field communications), the other device can determine it was not the intended recipient and ignore the message. All far field communication messages will include identifiers so that only the intended recipient of the message will act upon the message. As noted above, controllers 54a and 54b will be able to talk to each other exclusively, despite the possibility that other far field communications devices may be in range and may "hear" the messages therebetween.

In the embodiment show in FIG. 1, controller 54b sends wireless commands to controller 54a using far field communication after the two controllers have been associated. Similarly, controller 54a send messages back to controller 54b. Such return messages include status messages, or other information. Controller 54b is in communication with user interface 46 of footboard 34 and sends the appropriate commands to mattress 36 based on a user's manipulation of user interface 46. In this manner, controller 54b of footboard 34 is able to wirelessly control mattress 36 using far field communication based upon the instructions input into user interface 46 by a user. A caregiver can thus control mattress 36 via user interface 46 without having to connect any cords, cables, or wires to either footboard 34, or any other physical structure on patient support apparatus 20. Depending upon the specific content of the commands sent to mattress 36, mattress 36 will respond (via controller 54a) with status information or other information that, in some instances, is displayed on user interface.

While the particular messages between controller 54a and 54b will vary from one embodiment of patient support apparatus 20 to the next, and one embodiment of mattress 36 to the next, such messages will typically include commands sent from the footboard controller 54b to the mattress controller 54a to inflate or deflate one or more bladders within mattress 36, begin or end a treatment therapy instituted using mattress 36 (e.g. percussion therapy), turn a patient positioned on mattress 36, or perform other actions. Mattress controller 54a will typically forward status messages and responses to the commands it receives from footboard controller 54b.

Although FIG. 1 illustrates the example of footboard 34 wirelessly controlling mattress 36, it will be understood by those skilled in the art that the same principles described above can be used to enable footboard 34 to control other aspects of patient support apparatus 20. For example, footboard 34 could be used to control, or otherwise communicate with, one or more sensors that are positioned on patient support apparatus 20. One such sensor may be a patient pressure sensing system, such as the pressure sensing mat 34 described in commonly assigned, PCT patent application Ser. No. PCT/US12/27402 filed Mar. 2, 2012 by applicants Richard Derenne et al., and entitled SENSING SYSTEM FOR PATIENT SUPPORTS, the complete disclosure of which is incorporated herein by reference. Alternatively, footboard 34 can be used to wirelessly control both a mattress, such as mattress 36, and another device, such as a patient pressure sensing mat, or still another device or devices.

In one embodiment, footboard controller 54b controls both a mattress 36 and a pressure sensing mat, such as the mat 34 described in the PCT application mentioned above. In this embodiment, only the mattress 36 includes a near field and far field transceiver. The pressure sensing mat is plugged into the mattress and uses the mattress's near field and/or far field transceivers as conduits for communication with footboard controller 54b. In other words, the pressure sensing mat does not communicate directly with footboard controller 54b, but rather routes and receives messages through the transceivers of mattress 36.

In yet another embodiment, footboard controller 54b wirelessly controls both mattress 36 and the pressure sensing mat by communicating wirelessly with each of them directly. That is, both mattress 36 and the pressure sensing mat include near field and far field transceivers that establish communication with the near field and far field transceivers 48b and 50b, respectively, contained within footboard 34. Communications controller 54b of footboard 34 uses near field transceiver 48b to establish that the mattress 36 and pressure sensing mat are physically adjacent to footboard 34, and then uses far field transceiver 50b to communicate independently with the far field transceiver 50a in mattress 36 and the far field transceiver within the pressure sensing mat (not shown).

Figure 21:
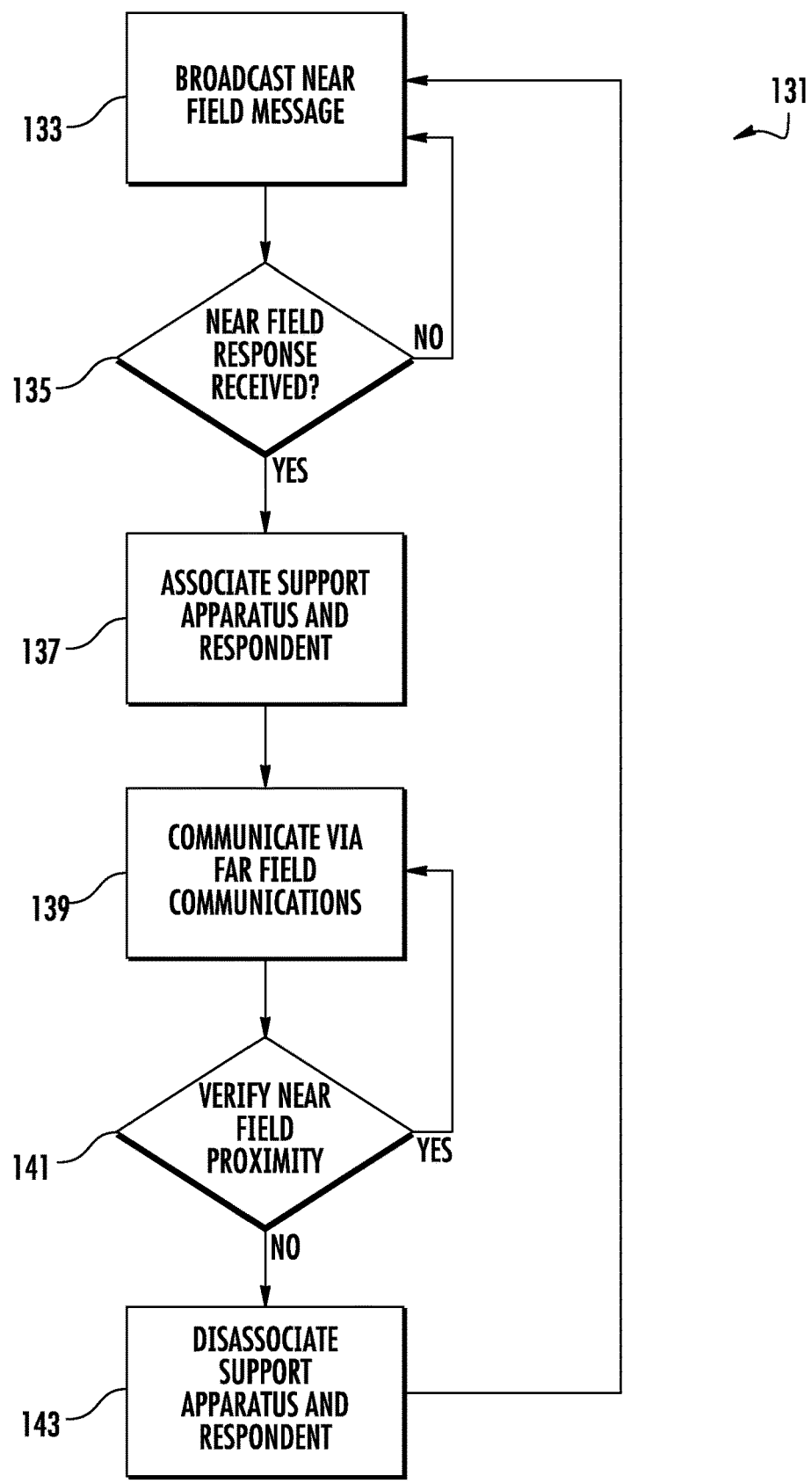
FIG. 21 is a flow chart of an illustrative communication algorithm that may be used with any of the patient support apparatuses disclosed herein.

FIG. 21 illustrates an illustrative communication algorithm 131 that is followed by controller 54b when communicating with controller 54a of mattress 36, or when communicating with any of the other controllers 54 disclosed herein. Indeed, communication algorithm 131 is usable by any of the controllers 54 disclosed herein, not just controller 54b. Communication algorithm 131 starts at step 133 where controller 54 broadcasts a near field message. At step 135, controller 54 monitors its associated antenna for any near field responses to the message it broadcast at step 133. If no responses are received, then control returns to step 133, where another near field message is broadcast. If controller 54 receives a valid response to its near field message at step 135, it associates itself at step 137 with the respondent device that responded to the message broadcast at step 133 (more specifically, it associates the respondent and the patient support apparatus to which controller 54 is coupled). After associating step 137 is complete, information is communicated between controller 54 and the respondent device via far field communication. The communicated information will vary from situation to situation, depending at least in part upon what type of device the respondent is, and also the type of device to which controller 54 is coupled. Either simultaneous with such far field communication, or intermittently between the far field messages, controller 54 re-verifies at step 141 that the respondent device and the patient support apparatus are still within near field communications distance of each other. This is accomplished by transmitting another near field message to the respondent and waiting for the appropriate response. If no response is received (or no responses are received after multiple tries), controller 54 moves to step 143. If a response is received, then controller 54 determines that the respondent device must still be within near field communications range of the patient support apparatus, and control returns to step 139, where far field communications are able to continue to take place. At step 143, controller 54 disassociates itself from the respondent device, and control returns to step 133.

Communication algorithm 131 may also be modified in a number of different aspects. In one modified version, controller 54b time stamps the moment when the patient support apparatus becomes associated with the respondent at step 137. This time stamping includes logging the specific identify of the recipient which has been associated with the patient support apparatus. Such identity includes not only information identifying the type of recipient (e.g. mattress, sensing mat, medical device, furniture, etc.), but also information uniquely identifying that particular recipient, such as, for example, a serial number. In addition to recording this information, the same information is also stored at step 143 when the patient support apparatus and the recipient are disassociated from each other. This time stamped log of associations and disassociations is recorded in memory on patient support apparatus and made available for forwarding to any desirable application on a healthcare network 74 (discussed in greater detail below). This stored association-disassociation data includes the times of association and disassociation of the specific recipient, as well as information identifying the specific patient support apparatus (so that the data for any given patient support apparatus is distinguishable from the data for another patient support apparatus). By saving this information and making it available to commercially available programs that are running on the healthcare network 74, this information can be used for other purposes, such as, for example, infection control and/or billing.

For example, if a healthcare facility determines that a particular patient has contracted a contagious infection, suitable software can query the information gathered by the patient support apparatus to see a list of equipment that has been used with that particular patient. This enables the healthcare facility to know precisely what equipment may need to be disinfected. Further, as another example, by making the stored association and disassociation data available to third party software applications, healthcare billing software can access this information and use it for billing patients. That is, the healthcare facility can charge the patient for the use of specific equipment, and the stored association-disassociation data can be used to determine the specific equipment that was used with a specific patient, as well as the amount of time it was used with that particular patient. The stored association-disassociation data may alternatively be used for other purposes.

Figure 2:
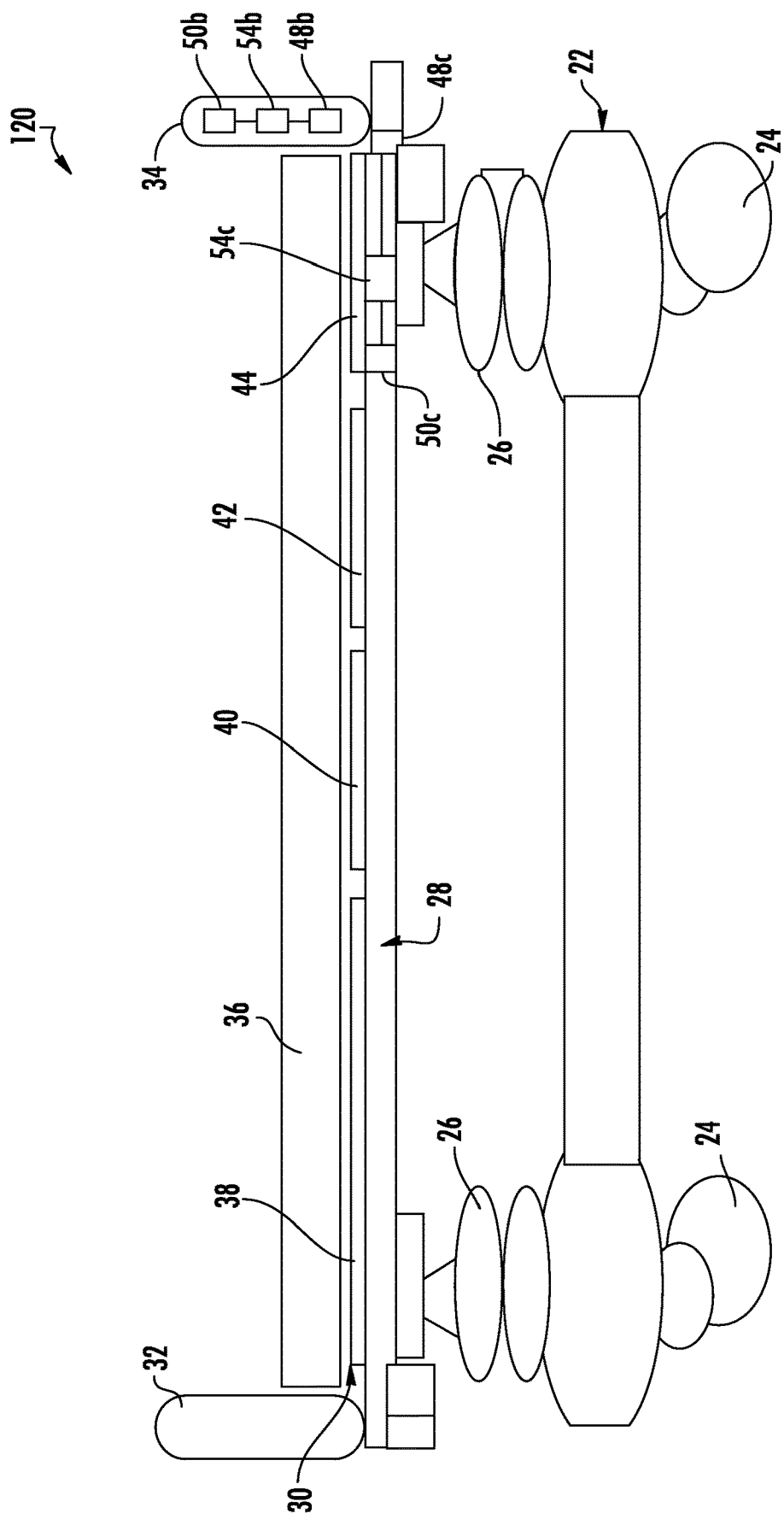
FIG. 2 is a side elevation view of a patient support apparatus according to a second embodiment.

FIG. 2 illustrates another embodiment of a patient support apparatus 120 that includes a configuration of near field and far field communication that is different from that shown in FIG. 1. For purposes of description, those components of patient support apparatus 120 that are common to patient support apparatus 20 will bear the same reference number. Those components that are similar but have changed in some respect will bear the same number raised by one hundred. New components will bear a new reference number.

Patient support apparatus 120 includes a footboard 34 having a near field communication controller 54b incorporated therein. It further includes a near field transceiver 48b and a far field transceiver 50b, both of which are under the control of controller 54b. Each transceiver 48b and 50b further includes a corresponding antenna (not shown) that enables it to communicate using the near field and far field communication protocols. While not shown, footboard 34 includes a user interface that is either the same as, or a modified form of, the user interface of patient support apparatus 20. The frame 28 of patient support apparatus 120 supports or includes a controller 54c, a near field transceiver 48c, and a far field transceiver 50c. These items are positioned at any suitable location on frame 28, or any other location on patient support apparatus 120 that is separate from footboard 34.

Controllers 54b and 54c establish an association with each other in the same manner as controllers 54a and 54b of FIG. 1. That is, one of the near field transceivers 48b or 48c initially sends a near field communication to the other that includes the transmitter's identity. The recipient responds with a message that includes the recipient's identity. Assuming no third or other near field transceivers are sufficiently close to one or both of these transceivers to respond to these communications, the two transceivers 48b and 48c then associate themselves with each other. If a third transceiver responds, then steps such as those described previously are taken to determine which controllers 54 are to be associated with each other (e.g. reducing the power of the transmissions, or using shielding, if available, etc.). Once an association is established, communications between footboard 34 and controller 54c of patient support apparatus 120 is able to take place via far field communications transceivers 50b and 50c, which will have a higher data rate than the near field communications.

By including the controllers 54b and 54c in footboard 34 and frame 28, as well as the associated transceivers, it is possible to have footboard 34 control one or more aspects of the operation of patient support apparatus 120 via wireless communications that emanate from footboard 34. This eliminates the need for any wired connection between footboard 34 and the rest of patient support apparatus 120. This further makes it easier to attach and remove footboard 34 to and from frame 28 because no data wires or electrical connectors need to be attached/detached or aligned with each other. Further, patient support apparatus 120, in some embodiments, includes an inductive power coil (not shown) that enables electrical power to be transmitted wirelessly from frame 28 to footboard 34 so that no power cables, wires, or connectors need to be established. The inductive power coil may be separate from the antenna coils of transceivers 48b and 50b, or, in some embodiments, they may be the same. That is, in some embodiments, the near field antenna coils communicate both data and electrical power.

Controller 54c is either in direct communication with one or more actuators on patient support apparatus 120, or is in communication with one or more separate controllers (not shown) that control such actuators. Controller 54c acts upon commands received wirelessly from footboard 34 to control one or more aspects of the operation of patient support apparatus 120. Thus, for example, a user is able to press one or more buttons of footboard 34 to activate elevation adjustment mechanisms 26 and thereby change the height of frame 28 relative to base 22. Controller 54b forwards commands reflecting the pushed buttons to controller 54c using far field communications. Controller 54c then forwards the appropriate commands to the elevation adjustment mechanisms 25, or to one or more intermediary controllers that control the elevation adjustment mechanisms. The height of frame 28 is thereby changed. In addition to controlling elevation adjustment mechanisms 26, footboard 34 and its far field transceiver 50 can be used to control any desired aspect of patient support apparatus 120, including, but not limited to, the pivoting of any of the sections of patient support deck 30, the setting or releasing of a brake, the control of a patient exit detection system, the weighing of patient, the tilting of frame 28, the arming and disarming of a monitoring system, and still other tasks.

Figure 3:
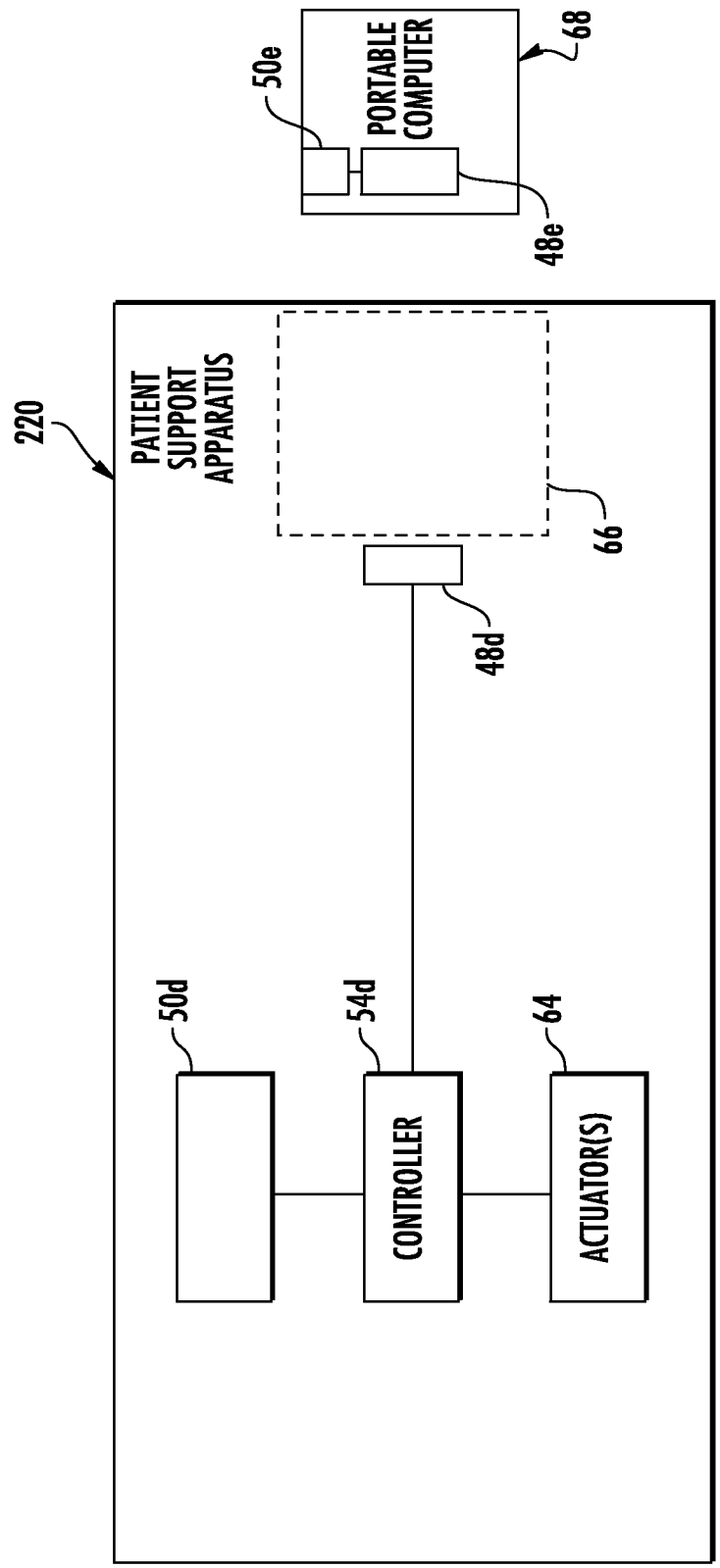
FIG. 3 is a plan view diagram of a patient support apparatus and portable computer according to a third embodiment.

FIG. 3 shows another embodiment of a patient support apparatus 220. For purposes of description, those components of patient support apparatus 220 that are common to patient support apparatus 20 will bear the same reference number. Those components that are similar but have changed will bear the same number raised by two hundred. New components will bear a new reference number.

Patient support apparatus 220 includes a controller 54d, a near field communications transceiver 48d, a far field communications transceiver 50d, and at least one actuator 64. Patient support apparatus 220 further includes a support or dock 66 for a portable computer 68. Dock 66 includes any portion of patient support apparatus 220 that is physically configured to support portable computer 68. Further, dock 66 is located at any suitable location on patient support apparatus 220. In some embodiments, dock 66 is built into footboard 34.

Portable computer 68 is any commercially available portable and general purpose computer, such as a laptop, notebook, or tablet computer (e.g. iPad, or the like) that has been modified, to the extent necessary, to include a near field communications transceiver 48e and far field communications transceiver 50e, as well as the necessary controls for controlling these two transceivers. Such portable computers typically operate using the Microsoft Windows, Linux, or Apple OS operating systems, although computer using other operating system can be used. In some embodiments, portable computer 68 is a smart phone, running any one of the Android operating system, the Apple iOS operating system, Nokia's Symbian, Research in Motion's BlackBerry OS, Samsung's Bada, Microsoft's Windows Phones, Hewlett-Packard's webOS, or another smart phone operating system. In one embodiment, the far field communications transceiver 50e is a WiFi or IEEE 802.11 transceiver that commonly comes integrated within computer 68 by the commercial manufacturer of computer 68. In such cases, far field transceiver 50d is also a WiFi or IEEE 802.11 transceiver that is able to communicate with the far field transceiver of computer 68. In another embodiment, the far field communications transceiver 50e is a Bluetooth transceiver that often comes integrated within commercially available portable computers, and in such cases, far field transceiver 50d is also a Bluetooth transceiver able to communicate via Bluetooth with computer 68.

In other embodiments, computer 68 also commercially includes a near field transceiver, while in still other embodiments, a near field transceiver must be added to computer 68 post-manufacturing. In one embodiment, the controller for these transceivers (48e and 50e) is the main central processing unit that controls the operation of computer 68 and is included in the manufacture of computer 68 (e.g. an Intel core or Pentium processor, an Advanced Micro Devices Opteron processor, or other processor). That is, a software application (or app for a smart phone) running on the portable computer 68 controls the communication of computer 68 with patient support apparatus 220 that takes place via transceivers 48e and 50e. In another embodiment, such control is carried out in any one or more co-processors that are included during the manufacture of computer 68. In still other embodiments, one or more separate controllers are added post-manufacturing.

Patient support apparatus 220 is configured to allow portable computer 68 to associate itself therewith, and to communicate information to and from computer 68. In some embodiments, this communication allows a user of computer 68 to wirelessly control one or more aspects of patient support apparatus 220. Indeed, in some embodiments, computer 68 is programmed to include a control panel image that is displayed on a display of computer 68 that mimics one or more of the control panels, or user interface 46, that are integrated into patient support apparatus 220. In this manner, a user of portable computer 68 can control any and all functions of patient support apparatus 220 without having to actually touch any portions of support apparatus 220, which is desirable in situations where infection control is a primary concern. Such control takes place through computer mouse clicking, touching or swiping on a touch screen, or pressing one or more buttons on the keypad of computer 68, or other methods.

Portable computer 68 and patient support apparatus 220 establish an association with each other in the same manner as has been described above with respect to controller 54a of mattress 36 and controller 54b of footboard 34. Computer 68 is programmed with an application that brings up a control panel image, or other means of controlling patient support apparatus 220, on its display to enable a user to control patient support apparatus 220 after the association between computer 68 and patient support apparatus 220 (i.e. controller 54d) has been established. Because portable computer 68 is intended to be portable, and may be carried by personnel from one bed to another (and used to control each bed it is carried to), computer 68 is programmed to periodically re-verify, or continuously re-verify, its association with a given patient support apparatus 220 via near field communication transceiver 48e. That is, portable computer 68 repetitively transmits messages via near field transceiver 48e to patient support apparatus 220 to repetitively verify that support apparatus 220 is in near field communication range of computer 68. So long as it remains within range, computer 68 is programmed to communicate with support apparatus 220 via far field transceiver 50e. If computer 68 moves out of range, then computer 68 will notify the user of computer 68 and cease controlling patient support apparatus 220. If computer 68 is moved to a different patient support apparatus, it will establish an association therewith and allow wireless control of the new patient support apparatus in the same manner as has been described. Thus, computer 68 will automatically establish an association with whatever patient support apparatus it happens to be within a near field vicinity of, thereby enabling a user to carry a single computer that can be used to communicate with all, or multiples of, the patient support apparatuses the user visits on his or her rounds.

Similar, or the same, repetitive re-verification of the association between portable computer 68 and controller 54d of patient support apparatus 220 is used in any of the embodiments discussed herein. That is, in one embodiment, controllers 54a of mattress 36 and controller 54b of footboard 34, after associating with each other, repetitively continue to send near field messages to each other to re-verify their physical proximity to each other, and thus their association. Similarly, controllers 54b and 54c may also do the same. Still further, any of the controllers discussed below may also repetitively re-verify the near field associations.

In addition to allowing portable computer 68 to control one or more aspects of patient support apparatus 220, portable computer 68 and controller 54d are programmed, in some embodiments, to allow other data to be transmitted between the two. This data includes, but is not limited to, patient information, alerts, sensor readings, patient weight, patient care protocol information, and the like. Portable computer 68 is further programmed, in one embodiment, to display an indication that it has established an association with patient support apparatus 220, including an indication of the specific apparatus 220 it is currently associated with. This allows a caregiver to visually confirm that computer 68 has associated itself with the proper support apparatus 220.

In one embodiment, portable computer 68 is the computer identified by the reference number 210 in commonly assigned, copending U.S. patent application Ser. No. 61/606, 147, filed Mar. 2, 2012 by applicants Cory Herbst, et al., and entitled PATIENT SUPPORT, the complete disclosure of which is incorporated herein by reference.

Figure 4:
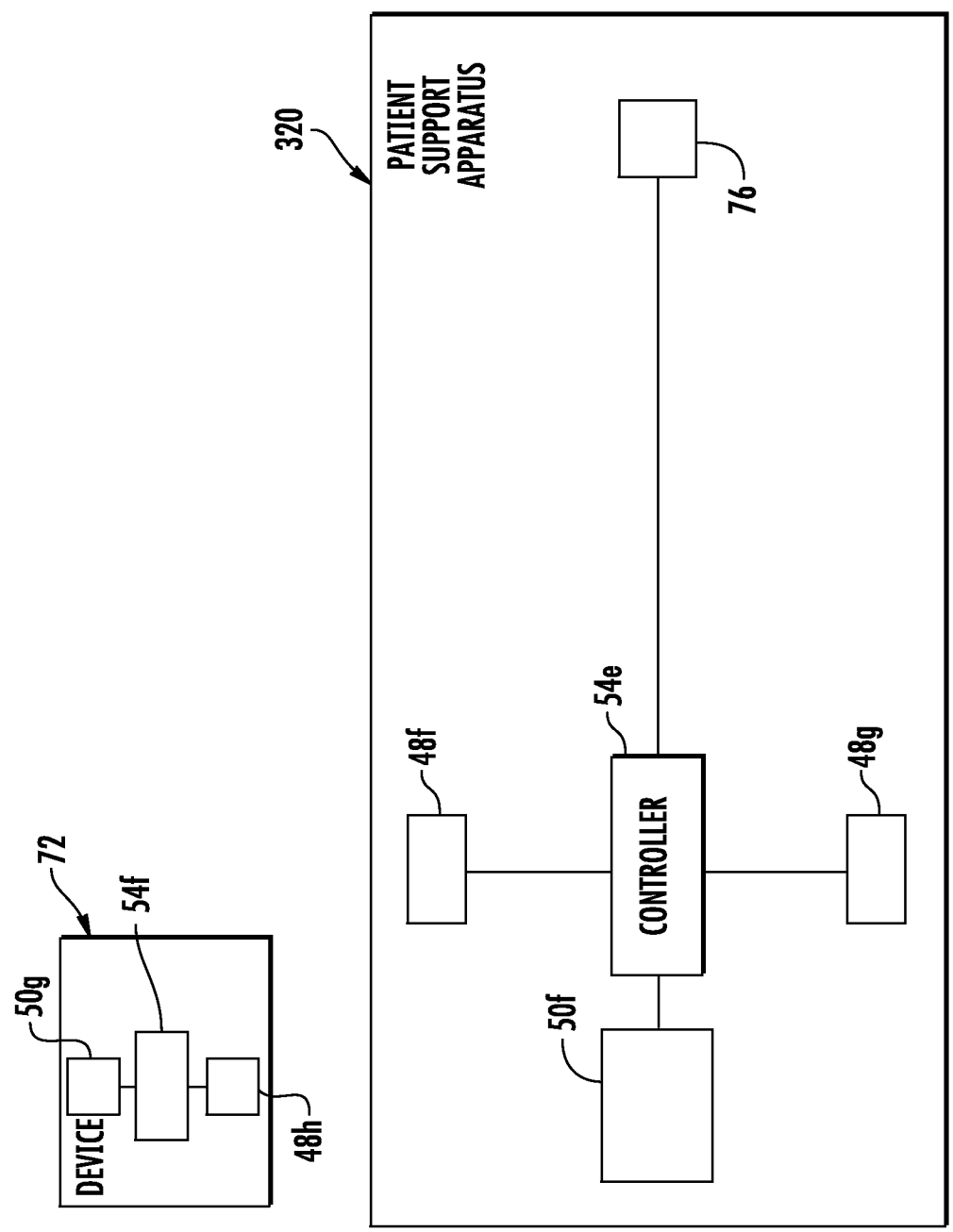
FIG. 4 is a plan view diagram of a patient support apparatus according to a fourth embodiment shown communicating with a device spaced from the patient support apparatus.

FIG. 4 illustrates another embodiment of a patient support apparatus 320 that incorporates near field and far field communication protocols. For purposes of description, those components of patient support apparatus 320 that are common to any of the previously described patient support apparatuses will bear the same reference number. Those components that are similar but have changed will bear the same number raised by three hundred. New components will bear a new reference number.

Patient support apparatus 320 includes a controller 54e that is in electrical communication with a first near field transceiver 48f and a second near field transceiver 48g. Controller 54e is further in electrical communication with a far field transceiver 50f. While not separately identified, transceivers 48f, 48g, and 50f, include, or are in communication with, appropriate antennas for enabling near field and far field communication, respectively. First near field transceiver 48f is positioned adjacent a first side 70a of patient support apparatus 320, while second near field transceiver 48g is positioned adjacent a second side 70b that is opposite first side 70a. Far field transceiver 50f is positioned anywhere on patient support apparatus 320 that allows far field communications to take place with medical devices, such as a medical device 72, that may be positioned in the same room, or otherwise within far field communication range.

Near field transceivers 48f and 48g are positioned along sides 70a, 70b of patient support apparatus 320 in order to be able to communicate with one or more medical devices 72 that could be in use with respect to a patient positioned on support apparatus 320. Such apparatuses include, but are not limited to, ventilators, respirators, pumps, or the like. Regardless of the specific type of device, medical device 72 is any conventional medical device that includes a near field transceiver 48h, a far field transceiver 50g, and a controller 54f. Because such medical devices will typically be positioned adjacent patient support apparatus 320 when used in the treatment of a patient positioned thereon, near field transceivers 48f and 48g are positioned along the sides 70 of support apparatus 320 so that they will likely be within near field communication range of the medical device(s) that are being used to treat the patient supported on support apparatus 320. In some embodiments, medical device 72 is a microclimate management system that is supported on the patient support apparatus 320 itself, such as the microclimate management system disclosed in commonly assigned U.S. patent application Ser. No. 12/899,059 filed Oct. 6, 2010 by applicants Martin Stryker et al. and entitled MICROCLIMATE MANAGEMENT SYSTEM, the complete disclosure of which is hereby incorporated herein by reference. In such embodiments, the one or more near field transceivers 48f and/or 48g are suitably positioned to communicate with one or more near field transceivers that are incorporated into the microclimate management system.

Controller 54e sends out messages via both near field transceivers 48f and 48g that ask any medical devices 72 having near field transceivers to respond with their identity. Because of the very limited distance of this near field communication, any such medical devices 72 that do respond will have to be within a close physical proximity to one or both of transceivers 48f or 48g. Further, because of this close physical proximity, controller 54e will conclude that the responding medical device is associated with patient support apparatus 320. That is, controller 54e will conclude that the medical device 72 is being used in the treatment of the specific patient who is assigned to patient support apparatus 320. Controller 54e will therefore associate itself, and/or patient support apparatus 320, with the one or more responding medical devices 72.

In some embodiments, controller 54e delays associating patient support apparatus 320 with the responding medical device 72 until after multiple successive messages have been exchanged via near field communication between one or both transceivers 48f, 48g and the near field transceiver 48h of the medical device 72. By requiring multiple successive communications, mistaken associations that might otherwise occur due to a transitory positioning of the medical device 72 next to patient support apparatus 320 are avoided. Further, controller 54e, in some embodiments, does not associate the medical device 72 and patient support apparatus 320 with each other until the medical device 72 sends information to controller 54e—either via near field communication or far field communication—indicating that it is in use. Therefore, if medical device 72 is merely passively positioned next to patient support apparatus 320, controller 54e will not associate the two.

Controller 54e, in some embodiments, is also configured to send one or more messages to the controller 54f of medical device 72 indicating that it has concluded that the two structures (medical device 72 and patient support apparatus 320) are associated. Further, the messages from patient support apparatus 320 will provide one or more of the following: an identity of patient support apparatus 320, an identity of the patient assigned to patient support apparatus 320, the current location within the healthcare facility (e.g. room number and/or the specific bay within a multi-patient room) of patient support apparatus 320 and medical device 72, and/or any other information that controller 54e has access to that controller 54f of medical device 72 may not otherwise have access to. Controller 54f of medical device 72 then uses this information to associate the medical data that it generates with the specific patient assigned to patient support apparatus 320, or the specific patient support apparatus 320 it is positioned next to, or the current location of medical device 72. The specific medical data generated by medical device 72 will depend upon what type of medical device that medical device 72 is. In many instances, the medical device 72 will generate some data that is usefully forwarded to an electronic medical system, or that is useful for a remotely positioned caregiver to know about (such as, but not limited to, for example, alerts), or that is otherwise desirably forwarded from medical device 72 to another location.

Figure 6:
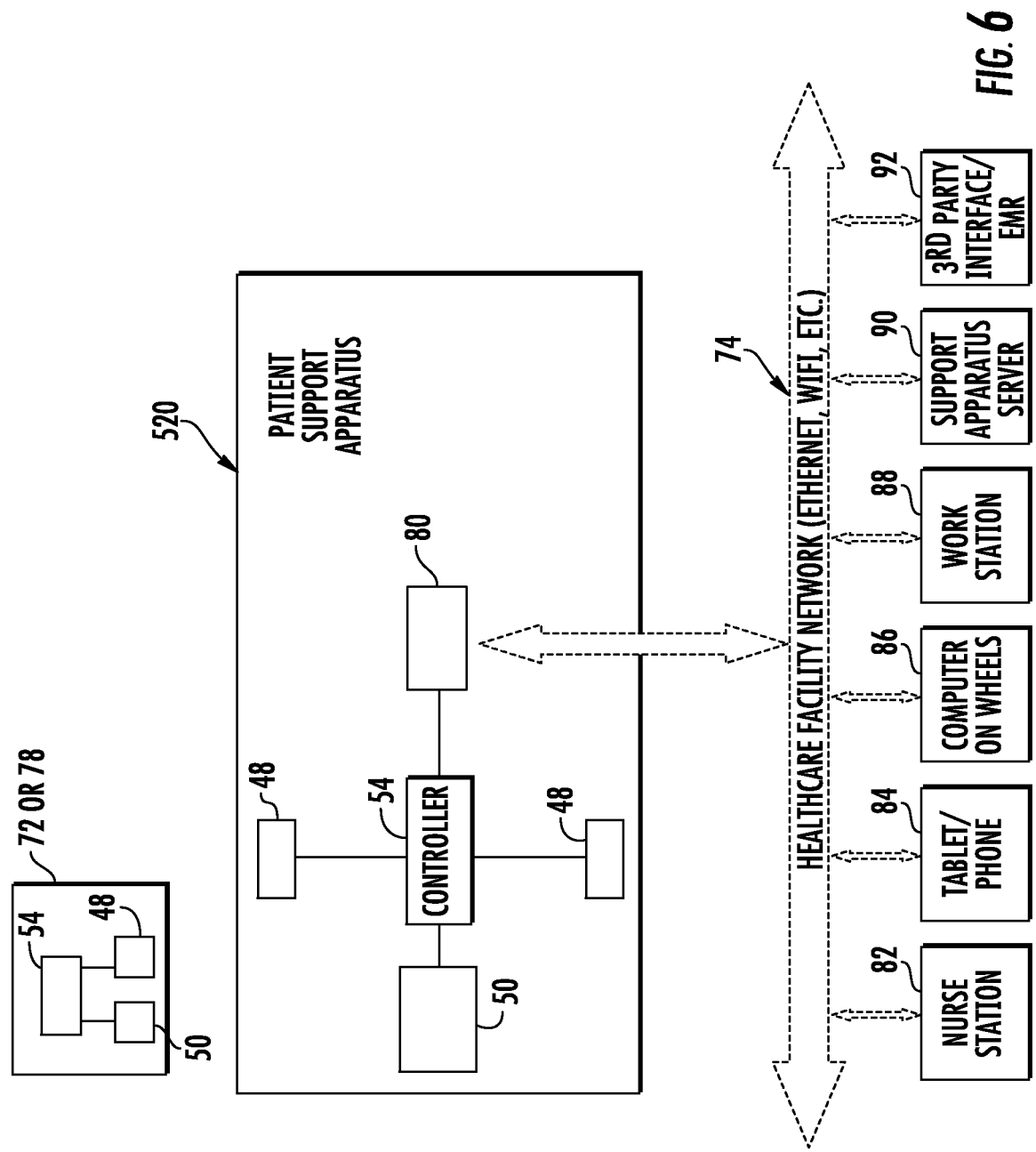
FIG. 6 is a plan view diagram of a patient support apparatus according to a fifth embodiment that may communicate with a device, as well as with a healthcare computer network.

Once controller 54f receives information from controller 54e of patient support apparatus 320 indicating that the two are associated, or indicating the identity of the patient supported thereon, or indicating the location of patient support apparatus 320 (and thus the location of medical device 72 as well), controller 54 will be able to transmit this information along with the medical data it generates to a remote location. For example, in one embodiment, controller 54f uses far field transceiver 50g to transmit its medical data to a healthcare computer network 74 (an example of which is shown in FIG. 6), which is often an Ethernet. Controller 54f also transmits via far field transceiver 50g the association information, or patient ID information, or current location information. One or more applications or servers on this network receive the medical data and the association, patient ID, or current location information. If the application or server receives association data or current location data, it used this data to determine what specific patient the medical data corresponds to by consulting one or more databases that correlate patient ID data to either specific patient support apparatuses 320 or to current locations. Such databases will be electronically accessible via the healthcare computer network 74. In this way, the medical device data can be matched to a specific patient. This automatic matching can reduce the labor burden on the caregivers who might otherwise have to manually enter information into a user interface on medical device 72 that identifies the specific patient being treated by medical device 72, or otherwise manually enter information into a computer on network 74 that identifies the patient assigned to medical device 72.

In some embodiments, far field transceiver 50 is a WiFi transmitter that communicates with a wireless access point of the healthcare network 74. In other embodiments, controller 54g communicates with network 74 using a different far field transceiver (not shown) than the far field transceiver 50g used to communicate with patient support apparatus 320. In still other embodiments, medical device 72 is configured to forward its medical device information to patient support apparatus 320, which then relays the medical device information to network 74 using far field communications transceiver 50f, or another far field communications transceiver. In such cases, the patient support apparatus 320 operates as a conduit for forwarding information from medical device 72 to network 74.

Medical device 72 and patient support apparatus 320 each include far field transceivers 50g and 50f, respectively, that they use to share data with each other at a higher rate than what is possible using near field transceivers 48. Device 72 and apparatus 320 are capable of using this far field communication channel to communicate medical data of device 72, or the patient ID, room location, or patient support apparatus 320 ID with each other. Indeed, any information that is desirably communicated between device 72 and apparatus 320 may be shared using the far field communication channel.

Once near field communications have been established between device 72 and apparatus 320, such near field communications are continuously or periodically updated to re-verity the association of the two structures, as has been described previously. If the near field communications is unable to take place, then patient support apparatus 320 will terminate the association until the near field communications are re-established.

In one embodiment, patient support apparatus 320 will not automatically associate apparatus 320 and device 72 after near field communications between the two are established. Instead, controller 54e of support apparatus 320 will provide an indication on a user interface 76 of a tentative association between apparatus 320 and 72 and request confirmation from a caregiver. User interface 76 is positioned at any suitable location on support apparatus 320, such as, but not limited to, on a footboard 34 of apparatus 320. User interface 76 may include a liquid crystal display, a touch screen, lights, or other structures for communicating information to a caregiver. The indication provided on user interface 76 will include an identification of the medical device 72 and a request for the caregiver to either confirm or cancel the tentative association. The confirmation may involve the simple pressing of a button, or an area on a touch screen. By requiring caregiver confirmation before making associations, a double check is provided that helps prevent any mistaken associations between device 72 and a nearby, but not associated, patient support apparatus 320.

While the example of support apparatus 320 shown in FIG. 4 illustrates only a single medical device 72, it will be understood by those skilled in the art that support apparatus 320 is able to simultaneously, or nearly simultaneously, be in near field communication with multiple medical devices 72. In such cases, controller 54e makes multiple associations between patient support apparatus 320 and the multiple medical devices 72. Further, in some embodiments, controller 54e is configured to act as a communication conduit between the medical devices 72, sharing information received from one medical device 72 with another medical device 72, as appropriate.

Figure 5:
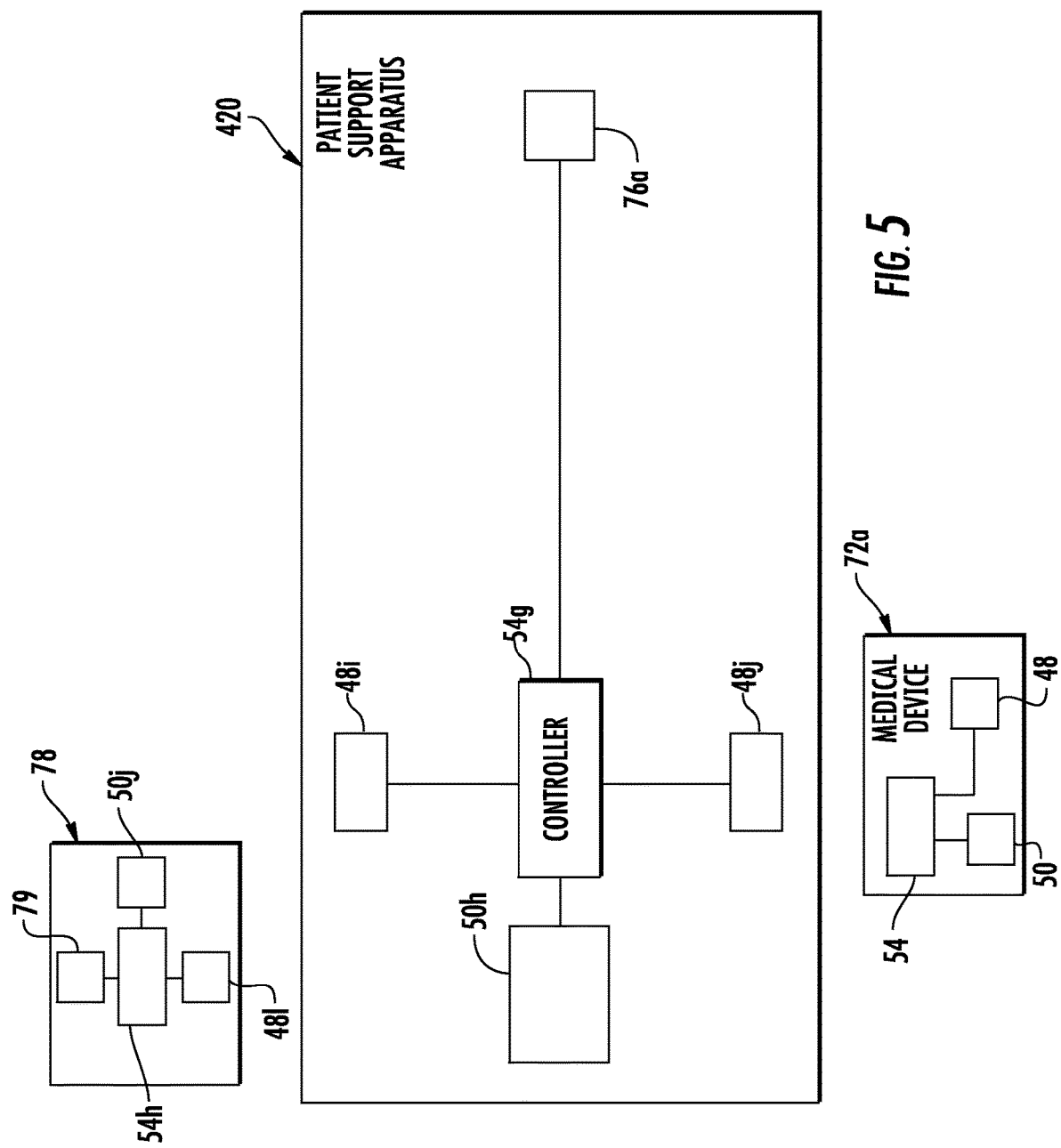
FIG. 5 is a plan view diagram of the patient support apparatus of FIG. 5 shown communicating with a chair or recliner, as well as a medical device.

FIG. 5 illustrates another patient support apparatus 420 that incorporates both near field and far field communications. For purposes of description, those components of patient support apparatus 420 that are common to any of the previously described patient support apparatuses will bear the same reference number. Those components that are similar but have changed will bear the same number raised by four hundred. New components will bear a new reference number.

Patient support apparatus 420 includes a plurality of near field transceivers 48i, 48j, at least one far field transceiver 50h, a controller 54g, and a user interface 76a, all of which are in electrical communication with each other, either directly or indirectly. As with all of the other patient support apparatuses described herein, patient support apparatus 420 can also include any one or more of the structures described above with respect to patient support apparatus 20 (e.g. a base 22, wheels 24, elevation adjustment mechanisms 26, frame or litter 28, support deck 30, headboard 32, footboard 34, mattress 36, and so on). Near field transceivers 48i and 48j are configured to communicate with other near field transceivers 48 that are positioned within a near field range thereof. Patient support apparatus 420 differs from patient support apparatus 320 in that controller 54g has been configured to be able to communicate not only with nearby medical devices 72, but also one or more pieces of furniture 78 that are positioned nearby and that have near field communication abilities. Thus, patient support apparatus 420 is configured to communicate with the nearby medical device 72a in FIG. 5 in the same manner as has been described above with respect to medical device 72 and support apparatus 320 (FIG. 4.) Further, support apparatus 420 is configured to provide the same association, and do so in the same manners described above, with medical device 72a as support apparatus 320 does with medical device 72. Accordingly, further description of the communications between support apparatus 420 and device 72a is not necessary.

The piece of furniture 78 in FIG. 5 is any of a variety of different types of furniture that are usefully positioned within a nearby vicinity to a patient support apparatus. In the embodiment shown in FIG. 5, furniture 78 is specifically a recliner chair. Furniture 78, however, may take on other forms. Furniture piece 78 includes a near field transceiver 48I, a far field transceiver 50j, and a controller 54h. Furniture piece 78 is configured, as well as controller 54g, to communicate similar types of information with patient support apparatus 420, and in a similar manner, as medical device 72. Furniture 78 generates data from one or more sensors 79 that are included in the furniture 78. In one embodiment, these sensors include a plurality of load cells that detect whether a patient is present on the furniture. The load cells may also detect movement of the patient thereon, including movement that is suggestive of the patient preparing to exit the furniture 78. In such cases, furniture 78 generates an exit, or pre-exit alert. Furniture 78 may also be configured to determine a patient's weight using sensors 79. Furniture 78 may gather still other information as well.

Regardless of the specific information gathered by furniture 78, controller 54h communicates via near field transceiver 48I and far field transceiver 50j with patient support apparatus 420 in an analogous manner to that described above with respect to patient support apparatus 320 and medical device 72. That is, support apparatus 420 uses near field transceivers 48i or 48j to establish, if possible, near field communication with near field transceiver 48I of chair 78. If such communications are successful, controller 54g associates support apparatus 420 with chair 78. Data indicating this association is then forwarded to chair 78 via near or far field communication, and/or it is forwarded to a healthcare computer network (e.g. network 74) via far field transceiver 50h, or by other means. Once the association occurs, controller 54g is configured to also be able to send specific patient ID, specific support apparatus ID, and/or current location information to chair 78. Chair 78 may then use this data so that its own internally generated data (e.g. from sensors 79) can be correlated to a specific patient, specific patient support apparatus, and/or a specific room or room location. If chair 78 is equipped to communicate directly with a healthcare computer network, this information will then be forwarded thereto, along with the sensor 79 information, so that one or more servers or applications on the network can process the data in a way that enables the data to be associated with a specific patient. Alternatively, chair 78 may forward all of the data it gathers to support apparatus 420 for forwarding to computer network 74.

By associating itself with patient support apparatus 420, one or more applications or servers on computer network 74 will be able to receive alerts that a specific patient has exited, or is about to exit, chair 78. Further, the activity of a specific patient may be monitored (e.g. how often he/she gets up, lies down, moves from support apparatus 420 to chair 78 and back again, etc.). This information may be stored, or made available to healthcare workers, via any of the servers or applications on network 74, or it may be communicated via user interface 76a.

FIG. 6 illustrates another patient support apparatus 520 having a separate network transceiver 80 that is used to communicate with healthcare network 74 which, as noted above, is commonly, but not necessarily, an Ethernet. In the embodiment of FIG. 6, far field transceiver 50 of support apparatus 520 is used solely to communicate with the far field transceiver 50 of either one or more medical devices 72, or one or more pieces of furniture 78. The communication and association between support apparatus 520 and device 72 or furniture 78 takes place in the same manners as have been described above. Network transceiver 80 is commonly a WiFi transceiver that is able to establish a wireless communication link with network 74, although it will be understood that other types of transceivers can be used.

FIG. 6 provides more detail regarding one or more third party applications or servers that are potentially resident on healthcare network 74. Such applications or servers may be conventional, commercially available applications or servers. The precise number and content of the servers/applications on network 74 will be dependent upon the particular healthcare facility in which support apparatus 520 is positioned, but FIG. 6 provides a representative sampling of some of the servers/applications that are common in a healthcare facility.

In the illustrative embodiment shown in FIG. 6, network 74 includes a plurality of nurses stations 82, one or more tablets or smart phones 84, one or more computers on wheels (COW) 86, work stations 88, and a patient support apparatus server 90. An electronic medical records (EMR) server 92 is also included. As noted, network 74 may further include one or more additional devices, applications, and/or servers, or it may include one or fewer devices, applications, and/or servers, depending upon the particular configuration that has been implemented at a particular healthcare facility. Such additional devices, applications, and/or servers may include an Admission, Discharge, and Transfer (ADT) system that manages the admission, discharge, and transfer of patients in the healthcare facility; and/or a workflow server that manages the work assignments of caregivers in the healthcare facility; and/or wireless alerting system that automatically forwards alarms and alerts to appropriate healthcare personnel via wireless communication technology. Such wireless communication technology includes technology for forwarding alerts via one or more of cell phones, WIFI devices, pagers, personal digital assistants (PDAs), or by other means. Any information that is transmitted to network 74 via network transceiver 80 of support apparatuses 520, or by network transceivers incorporated into other devices (e.g. device 72 or recliner 78) can therefore cause an alert to be forwarded to the appropriate caregiver(s), depending upon the contents of such information. The nurses station 82, tablets 84, computers on wheels 86, work stations 88, patient support apparatus server 90, electronic medical record systems 92, ADT systems, work flow systems, and wireless alerting systems may all be conventional products that are commercially available from one or more different suppliers, as would be known to one of ordinary skill in the art.

In one embodiment, patient support apparatus server 90 is a server that is commercially offered for sale by Stryker Medical of Kalamazoo, Mich. In other embodiments, patient support apparatus server 90 is a different type of server. Patient support apparatus server 90 coordinates communications between the various patient support apparatuses 520 in a healthcare facility and any of the other applications or servers that are present on network 74. Thus, server 90 receives communications from apparatuses 520 and then forwards—or makes available—information from those communications to selected entities on network 74, as appropriate. Either server 90, or one of the other applications or servers on network 74, includes a table or database containing information that either correlates patient identification with room location, or patient identification with specific patient support apparatus ID information. This table or database is used to associate incoming information with a specific patient, to the extent the incoming information does not already include this information. Thus, for example, if a support apparatus 520 sends information to server 90 about the patient supported thereon (e.g. their weight), but does not identify the specific patient, server 90 determines the patient ID by either using the room location information or the patient support ID information that is sent from support apparatus 520. More specifically, server 90 consults the table or database that correlates either the room location to patient ID, or the specific patient support apparatus ID to patient ID. In this manner, the incoming information is matched to the correct patient.

Figure 7:
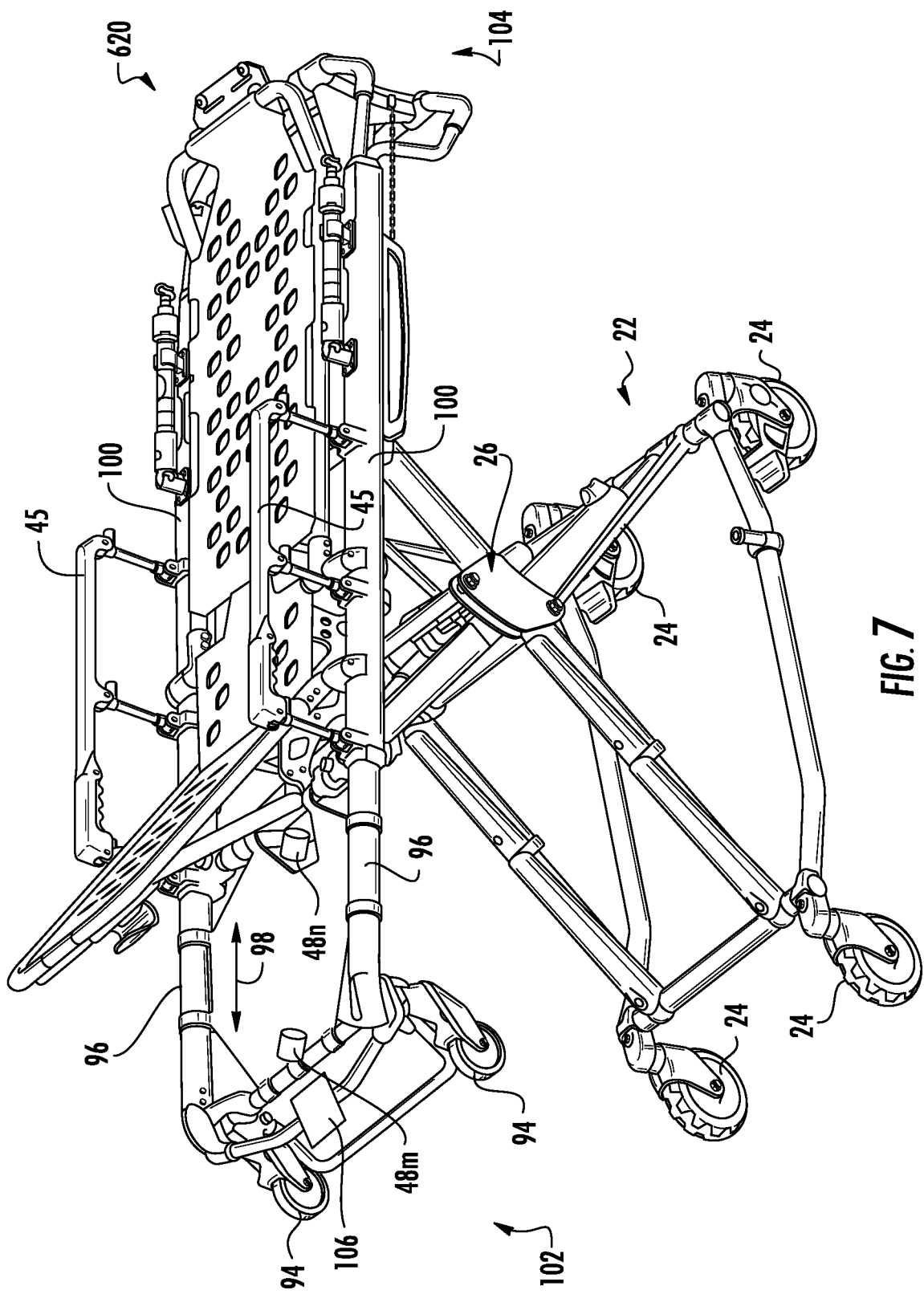
FIG. 7 is a perspective view of a patient support apparatus according to a sixth embodiment.

FIG. 7 illustrates another embodiment of a patient support apparatus 620 according to another embodiment of the present invention. In the embodiment of FIG. 7, patient support apparatus 620 is specifically a cot. Cot 620 includes a patient support deck 30 mounted to a frame or litter 28, which in turn is coupled to a plurality of legs that form patient elevation adjustment mechanisms 26. A base 22 supports the bottom of support apparatus 620 and includes a plurality of wheels 24. Support apparatus 620 further includes a pair of upper wheels 94 that are each attached to a telescoping arm 96. Telescoping arm 96 is movable back and forth in a direction indicated by arrow 98. This telescoping movement is accommodated by a pair of side arms 100 on litter 28 that have an internal diameter larger than the external diameter of telescoping arms 96 so as to receive the telescoping arms 96 therein. The telescoping movement of arms 96 helps facilitate the ingress and egress of cot 620 into and out of emergency vehicles, such as ambulances, rescue squads, helicopters, or the like. More specifically, by setting upper wheels 94 on top of a floor inside the ambulance, or other vehicle, a head end 102 of cot 620 can be supported via wheels 94, thereby enabling a caregiver at a foot end 104 of cot 620 to raise or lower base 22 while manually lifting the foot end 104 of cot 620.

Because of the telescoping movement of arms 96, prior cots have heretofore not included any control panel, or other electrical controls, at head end 102. Cot 620, however, includes a control panel 106 positioned at head end 102. Control panel 106 includes one or more buttons, switches, a touch screen, or other means of enabling a caregiver to control the operation of cot 620. In the embodiments shown, control panel 106 includes a control for automatically raising base 22 toward litter 28, and another control for automatically lowering base 22 from litter 28 toward the ground. This automatic movement is carried out by elevation adjustment mechanisms or actuators 26, which, in some embodiments, include one or more electric motors. The detailed mechanical construction of cot 620 may take on any of a variety of different forms. In one embodiment, the mechanical construction is the same as that described in commonly assigned, U.S. Pat. No. 7,725,968 issued to Clifford Lambarth and entitled AMBULANCE COT WITH RETRACTABLE HEAD SECTION AND CONTROL SYSTEM THEREFOR, the complete disclosure of which is hereby incorporated herein by reference.

Figure 8:
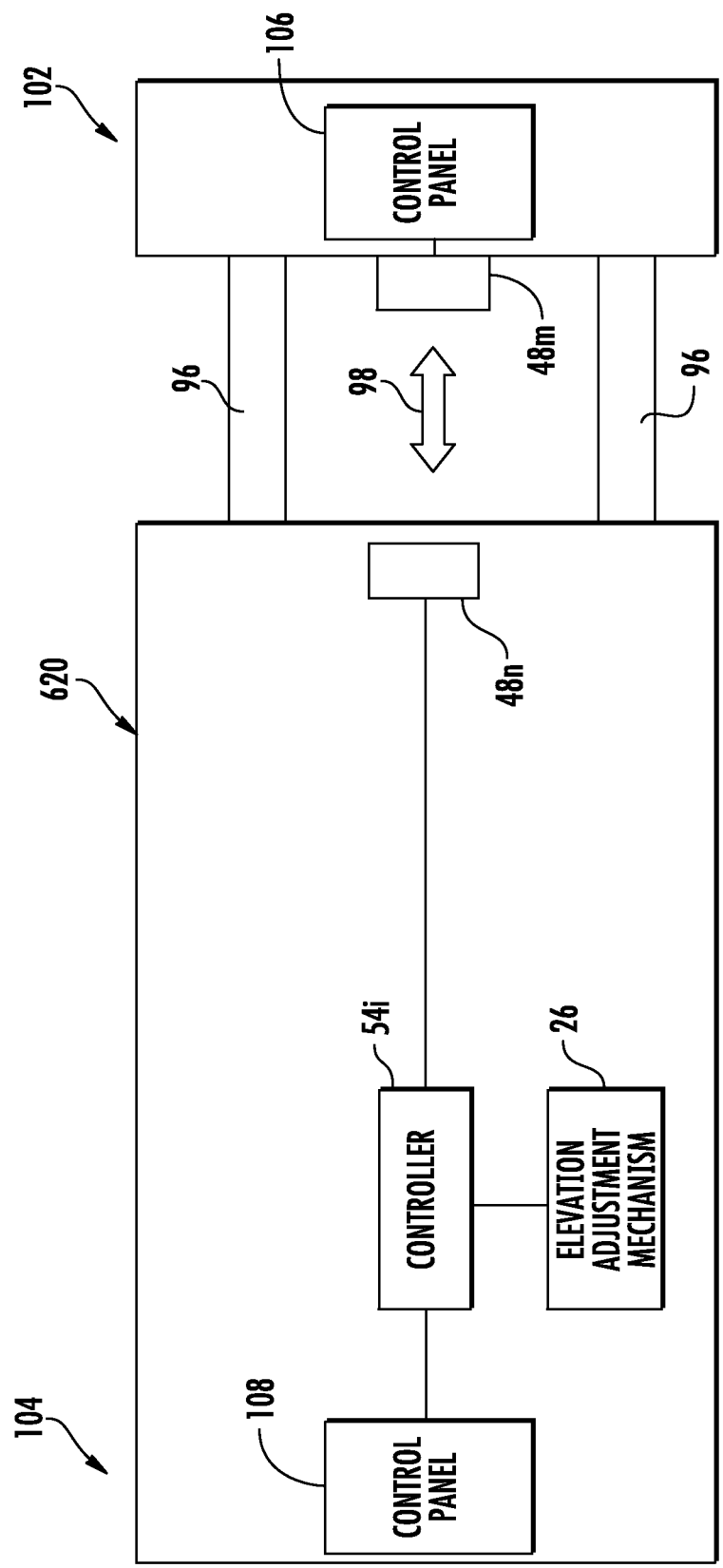
FIG. 8 is a plan view block diagram of the communications and control aspects of the patient support apparatus of FIG. 8.

FIG. 8 illustrates a control diagram corresponding to cot 620 that shows the manner in which the inputs received at control panel 106 are communicated to elevation adjustment mechanisms 26. Control panel 106 is in electrical communication with a near field transceiver 48*m*. The electrical signals generated by control panel 106 as a result of a user pressing on the one or more buttons, or otherwise manipulating the controls of panel 106, are forwarded to near field transceiver 48, either before or after additional processing. Indeed, a separate controller 54 (not shown) is included on cot 620 in some embodiments for interfacing between control panel 106 and near field transceiver 48*m*. Near field transceiver 48*m* is oriented and positioned on cot 620 at a location where it will be able to communicate with a corresponding near field transceiver 48*n* positioned on litter 28. This near field communication is able to take place regardless of whether or not telescoping arms 96 are in a fully extended position, a fully retracted position, or in some intermediate position between the two.

Near field transceiver 48*n* is in communication with a controller 54*i* that controls the operation of elevation adjustment mechanisms 26. Controller 54*i* is also in electrical communication with a second control panel 108 positioned at foot end 104 of cot 620. Controller 54*i* is therefore capable of receiving control signals for controlling elevation adjustment mechanisms 26 from either head end control panel 106 or foot end control panel 108. The communication between controller 54*i*, elevation adjustment mechanisms 26, foot end control panel 108, and near field transceiver 48*n* is carried out by wired connections. The communication between transceivers 48*n* and 48*m* is carried out via wireless near field communication. The communication between control panel 106 and near field transceiver 48*m* is carried out by wired connections. Thus, there are no wired connections between the electrical components supported on telescoping arms 96 (e.g. control panel 106 and near field transceiver 48*m*) and the electrical components supported on the rest of litter 28. By eliminating any wired connections between the components on telescoping arms 96 and the rest of litter 28, the challenges of designing and implementing a wired connection for an electrical component on a telescoping and movable member is avoided. That is, the difficulty of excess electrical wire slack when telescoping arms 96 are retracted is avoided, as well ensuring the sufficient electrical wire is always available for extending telescoping arms 96 without damaging the electrical wires.

Head end control panel 106 uses near field transceiver 48*m* to communicate the instructions it receives from a caregiver to raise or lower base 22. Because these commands occur only infrequently during the usage of cot 620, and because there is not a lot of data involved in communicating these commands, cot 620 does not include any far field transceivers 50. However, in alternative embodiments, particularly where control panel 106 may include additional functions, communicate additional information to and from controller 54*i*, cot 620 can be modified to include a pair of far field transceivers, one of which would be supported on telescoping arms 96 and the other of which would be positioned on litter 28. Such far field transceivers 50 could be in addition to, or in lieu of, near field transceivers 48*n* and 48*m*.

Because near field transceivers 48*n* and 48*m* are both fixed attached to cot 620 during the time of manufacture, there is no need for these transceivers 48 to follow the association algorithms discussed above. That is, both transceivers 48*n* and 48*m* can be programmed during manufacture to recognize each other as being on the same cot 620 and to be able to distinguish near field signals that might, on occasion, be detected from other transceivers that were temporarily positioned within near field communication vicinity of cot 620. Such programming can be carried out by assigning each transceiver 48*n* and 48*m* a unique ID that distinguishes them from other similar transceivers 48 positioned on similar cots, or by other means.

Figure 9:
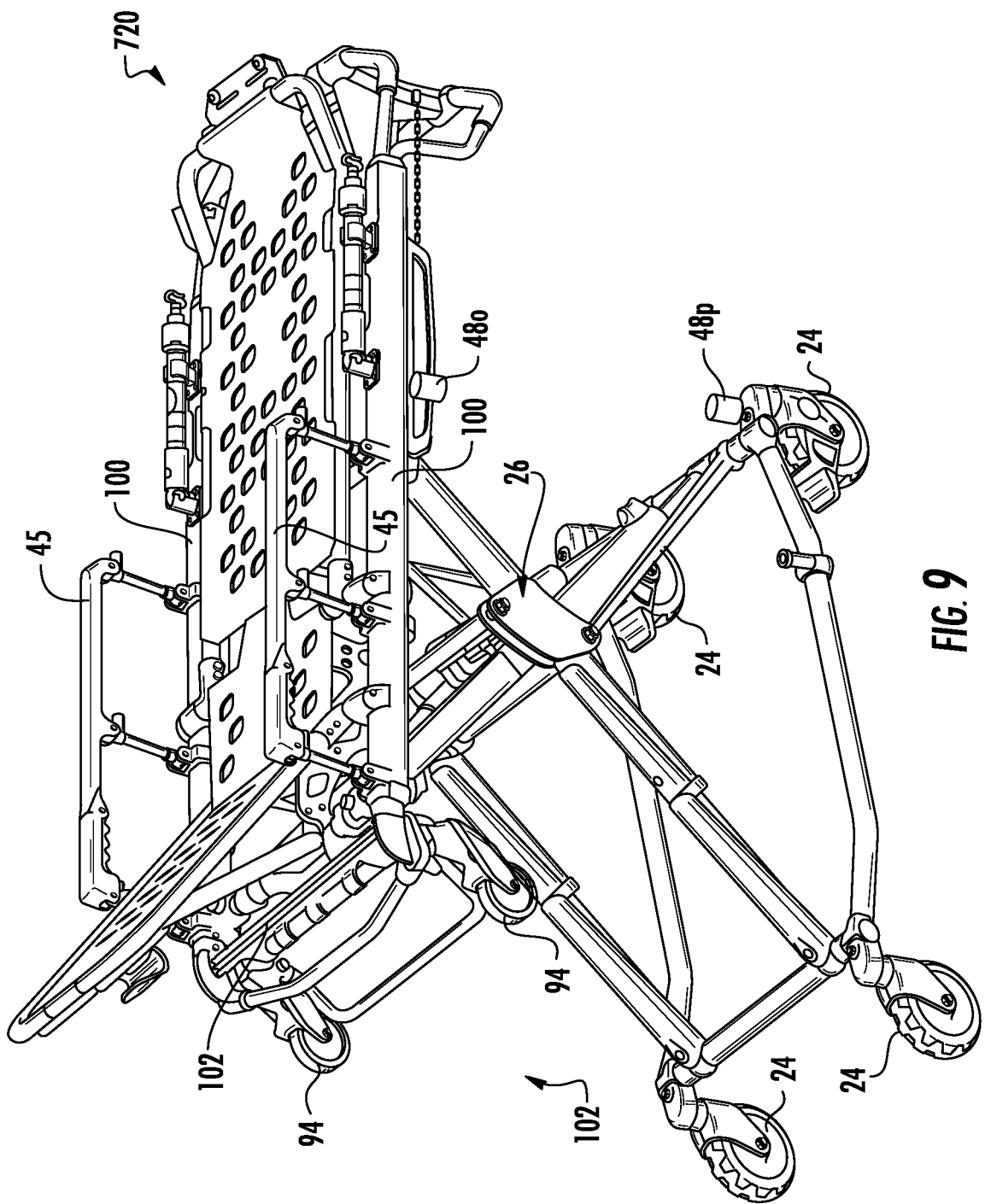
FIG. 9 is a perspective view of a patient support apparatus according to a seventh embodiment.
Figure 10:
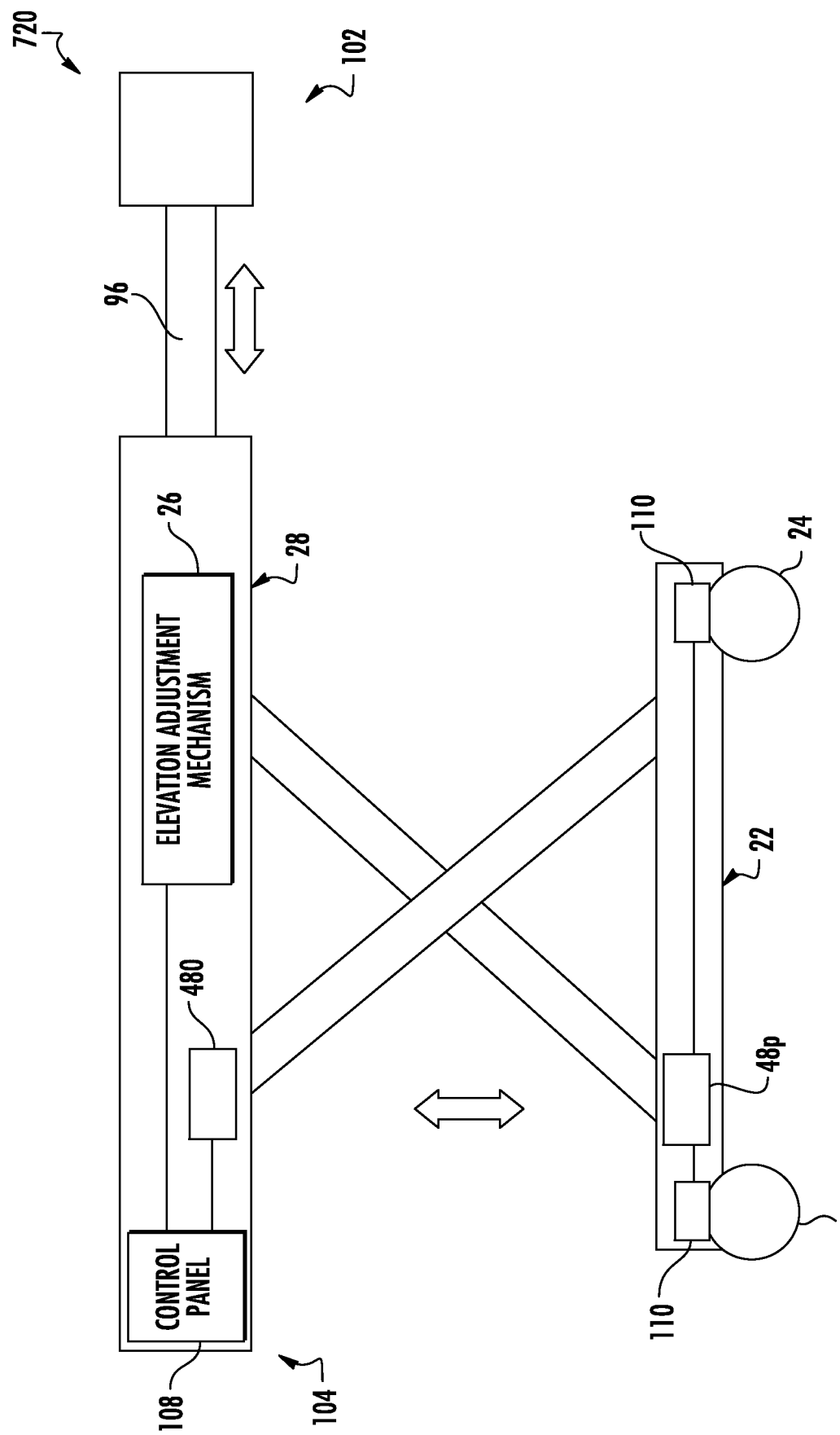
FIG. 10 is a side elevation view diagram of the communications and control aspects of the patient support apparatus of FIG. 10.

FIGS. 9 and 10 illustrate another embodiment of a patient support apparatus 720. As with patient support apparatus 620, patient support apparatus 720 is a cot, although it will be understood that the principles of cots 620 and 720 can be applied to different types of patient support apparatuses. As shown in the electrical diagram of FIG. 10, patient support apparatus 720 includes a foot end control panel 108 that is in electrical communication (via one or more wires) with a near field transceiver 48*o* and an elevation adjustment mechanism, or mechanisms, 26. Control panel 108 and elevation adjustment mechanism 26 operate in the same manner described above with respect to cot 620, and need not be discussed further herein. Near field transceiver 48*o* is positioned at any suitable location on litters 28 where it can communicate, via near field communication, with a corresponding near field communication transceiver 48*p* positioned on base 22 of patient support apparatus 720.

Near field communication transceiver 48*p* is in electrical communication with (via one or more wires) one or more wheel actuators 110. While FIG. 10 illustrates near field transceiver 48*p* being in electrical communication with two wheel actuators 110, it will be understood that, at least in some embodiments, transceiver 48*p* will communicate with only a single wheel actuator 110, while in other embodiments, transceiver 48*p* will communicate with three or four wheel actuators 110. Further, it will be understood that, although FIG. 10 does not identify a separate controller 54 for intermediating communication between wheel actuators 110 and near field transceiver 48*p*, such a controller can be added, or the functions of such a controller can be incorporated into either near field transceiver 48*p*, or wheel actuators 110, or distributed between the two.

Wheel actuators 110, in one embodiment, lock and unlock a brake for an associated wheel 24. Such locking and unlocking is carried out automatically in response to commands that are delivered to near field transceiver 48*p* through near field transceiver 48*o* (which, in turn, receives the commands from control panel 108). Cot 720 therefore enables a user to activate or de-activate the brakes on wheels 24 by manipulating a suitable control on foot end control panel 108. This electrical locking and unlocking of the brakes, in one embodiment, is the only means to lock and unlock the brakes. In another embodiment, this electrical locking and unlocking of the brakes works in conjunction with manual brakes that are positioned on one or more of wheels 24. When both electrical and manual brakes are included, the electrical brakes are configured to override the manual brakes such that a caregiver can release all of the manually set brakes via one or more controls on panel 108.

The number of wheel actuators 110 in a given embodiment of patient support apparatus 720 will depend upon the number of wheels 24 that are desirably able to be braked. In some embodiments, this may only be two wheels 24, while in other embodiments this may be all four wheels 24. In still other embodiments, the brake only brakes a single wheel 24. If only two wheels 24 are braked, the specific two wheels can be any of four wheels 24 shown in support apparatus 720.

As noted, patient support apparatus 720 is constructed so that base 22 is movable with respect to litter 28 generally vertically in the direction of arrow 112. That is, base 22 can be extended downwardly from litter 28, as shown in FIGS. 9 and 10, or it can be retracted upwardly toward litter 28 so that there is minimal separation between litter 28 and base 22. The physical construction of cot 720 that enables this movement in direction 112 can take on any suitable form. In one embodiment, cot 720 is constructed in the manner shown in commonly assigned U.S. Pat. No. 7,725,968 issued to Clifford Lambarth and entitled AMBULANCE COT WITH RETRACTABLE HEAD SECTION AND CONTROL SYSTEM THEREFOR, the complete disclosure of which has already been incorporated herein by reference. Other physical constructions are also possible.

Near field transceivers 48*o* and 48*p* are positioned at any suitable locations on cot 720 that enable them to communicate with each other using near field communications regardless of whether base 22 has been fully extended downward from litter 28, or has been fully retracted upward toward litter 28, or is in any intermediate position therebetween. As with cot 620, the near field communications of cot 720 enables communication between components that are movable with respect to each other without having to deal with the challenges of a wired connection (e.g. slack take up, extension, storage, and movement). Near field transceiver 48*o* transmits a command to near field transceiver 48*p* to either lock or unlock the brakes of one or more wheels 24, depending upon signals received from control panel 108. Near field transceiver 48*p* transmits information back to transceiver 48*o* indicating the status of the brakes, or acknowledging the transmitted information, or any other information that is usefully communicated to transceiver 48*o*. Depending on the information transmitted, transceiver 48*o* forwards the information to control panel 108 for display thereon (e.g. the current status of the brakes).

In another embodiment, wheel actuators 110 are configured to lock the steering of their associated wheels 24, rather than to lock the rotation of their associated wheels 24. That is, wheel actuators 110 are, in this embodiment, swivel locks that selectively prevent the swiveling of wheels 24 about a generally vertical rotational axis. When configured as swivel locks, wheel actuators 110 facility the steering of patient support apparatus 720 as it is pushed along the ground. That is, by preventing the swiveling of one or more wheels 24, a caregiver is better able to steer support apparatus 720 while pushing or pulling it over the ground. The physical construction of the swivel locks may take on any suitable physical form. In one embodiment, the swivel locks are of the type disclosed in commonly assigned U.S. provisional patent application Ser. No. 61/557,781 filed Nov. 9, 2011 by applicants William Childs et al. and entitled WHEELED CARRIAGE WITH BRAKE LOCK SYSTEM, the complete disclosure of which is hereby incorporated herein by reference. In another embodiment, the swivel locks and/or rotational locks are physically constructed as disclosed in the aforementioned commonly assigned U.S. Pat. No. 7,690,059 issued to Lemire et al., and entitled HOSPITAL BED, the complete disclosure of which has been incorporated herein by reference.

When wheel actuators 110 are configured as swivel locks, the number of wheels actuators 110 included on base 22 will be an even multiple. That is, either two or four of wheels 24 will include swivel locks 110. Further, if only two wheels 24 include swivel locks 110, the two wheels will be positioned on opposite sides of support 720 from each other, rather than on the same side with one positioned in front of the other.

The control of actuators 110 as swivel locks is effectuated in the same manner as the control of actuators 110 when implemented as brakes. That is, control panel 108 includes one or more controls for turning on and off the swivel locks. When one of these controls is manipulated in the appropriate manner by a caregiver, panel 108 sends a signal to near field transceiver 48o, which then sends a near field command to near field transceiver 48p. Transceiver 48p then forwards the command to the wheel actuators 110, causing them to either prevent or allow swiveling of their associated wheels 24. Status, or other information, may be sent back to control panel 108 via near field transceiver 48p and 48o.

It will be understood by those skilled in the art that, in still other embodiments, wheel actuators 110 can be configured to both selectively lock and unlock the rotation of wheels 24, as well as to selectively lock and unlock the swiveling of wheels 24. That is, control panel 108 may include separate controls—one (or one set) for braking and unbraking cot 720, and one (or one set) for locking and unlocking the swiveling ability of one or more wheels 24. The signals from these controls are forwarded to actuators 110 via the near field connection between transceivers 48o and 48p.

It will also be understood by those skilled in the art that the near field communications of cots 620 and 720 can be combined into a single cot, if desired. That is, in one embodiment, a cot (not shown) includes near field transceivers 48m and 48n for communication between a head end control panel 106 and the main portion of litter 28, as well as near field transceivers 48o and 48p for communication between the main portion of litter 28 and base 22. In such an embodiment, controller 54i coordinates the communications from the multiple control panels to the different actuators (e.g. wheel actuators 110 and height adjustment mechanisms 26). Head end control panel 106 includes the same controls as those found on foot end control panel 108. That is, each control panel 106, 108 is able to raise and lower base 22, as well as to lock and unlock the brakes and/or lock and unlock the swiveling ability of one or more wheels 24.

Figure 11:
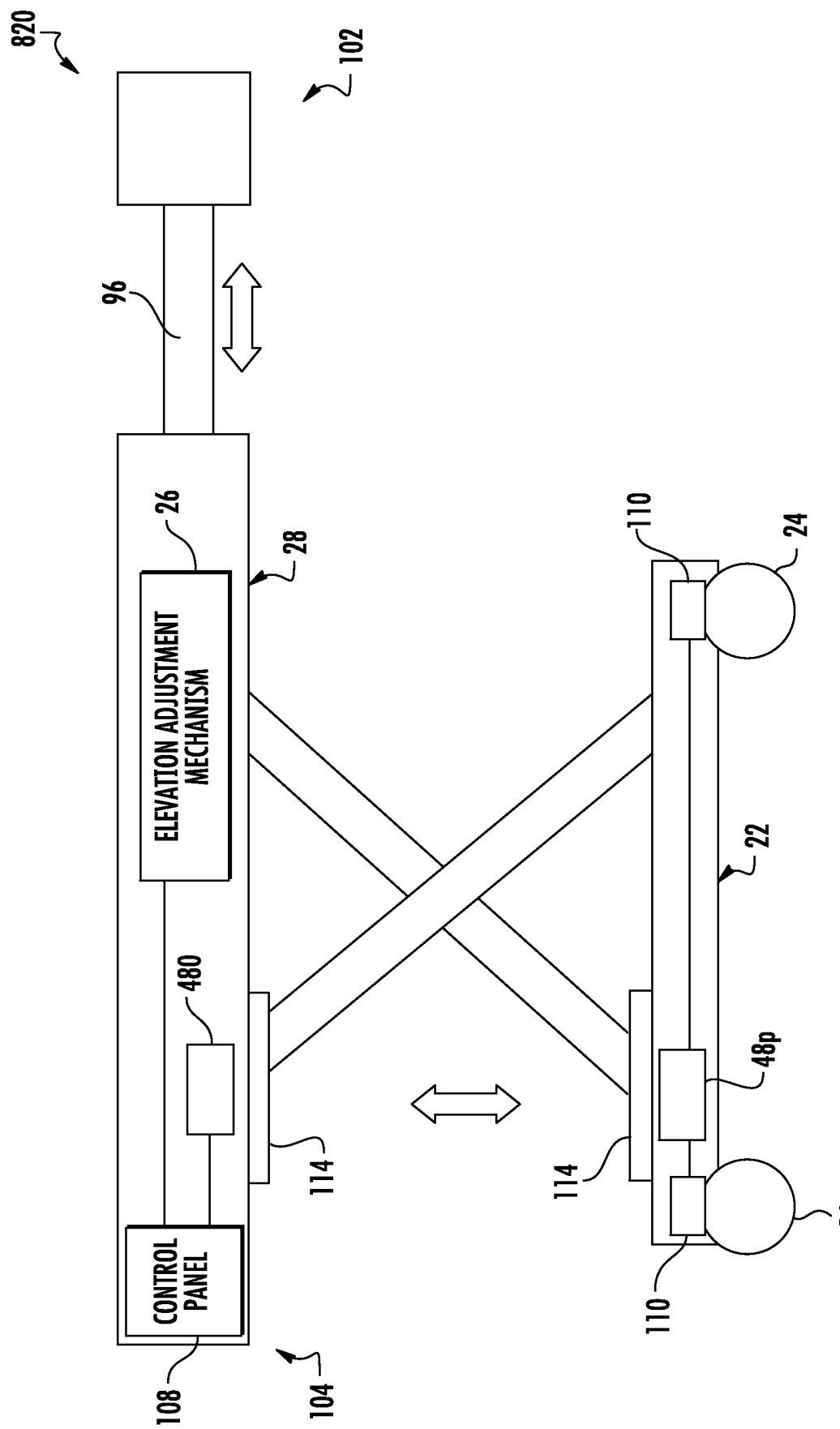
FIG. 11 is a side elevation view diagram of the communications and control aspects of another, alternative embodiment.

FIG. 11 illustrates another embodiment of a patient support apparatus 820. Patient support apparatus 820 is the same as patient support apparatus 720, and operates in the same manner with all of the same functionality and variable embodiments of support apparatus 720, with one exception. Patient support apparatus 820 includes the addition of a pair of flux concentrators 114 that are absent from support apparatus 720. Other than this addition, the two apparatuses 720 and 820 are the same. The description of the functionality of cot 720 applies equally to cot 820, and therefore need not be repeated.

Cot 820 includes a pair of flux concentrators 114 that are provided in order to increase the near field communication range of near field transceivers 48o and 48p. Such concentrators 114 are useful where the distance between base 22 and litter 28, when the two are extended apart, is greater than the near field communication ranges of transceivers 48o and 48p without the concentrators, or where it is otherwise desired to use less power in the near field communications between base 22 and litter 28. Flux concentrators 114 may take on a variety of different forms, many of which are discussed in greater detail with respect to FIGS. 12-17. In general, flux concentrators 114 provide a localized increase in the magnetic flux density that thereby increases the ability of an adjacent near field antenna to detect near field communications that are being sent to it. In other words, in the example of FIG. 11, the flux concentrator 114 on litter 28 assists transceiver 48o in detecting and receiving near field communications that are sent from transceiver 48p on base 22. Conversely, the flux concentrator 114 on base 22 assists transceiver 48p in detecting and receiving near field communications that are sent from transceiver 48o on litter 28.

In order to operate most effectively, each flux concentrator should be positioned next to the coil antenna of the transceiver at a distance less than about half the diameter of the flux concentrator 114. This relationship can be better understood with reference to FIG. 12, which shows a first coil antenna 52c, a second coil antenna 52d, a first flux concentrator 114a, and a second flux concentrator 114b. Each flux concentrator 114a,b is illustrated as a closed circuit with a capacitor 116 included. The wire of the closed circuit has an internal resistance that, in combination with the selection of a desired capacitive value, will create an RC constant that is suitable for use the near field communication frequency, as would be known to one of ordinary skill in the art. In other words, the selection of the specific value for capacitor 116 will be based upon the near field communication frequency and the internal resistance of the wire loops of flux concentrator 114a. Because the flux concentrators 114a and bin FIG. 12 are closed circuits, they do not need any supply of electrical power, and can be incorporated into components or devices (e.g. patient support apparatuses) without requiring an electrical connection.

Figure 12:
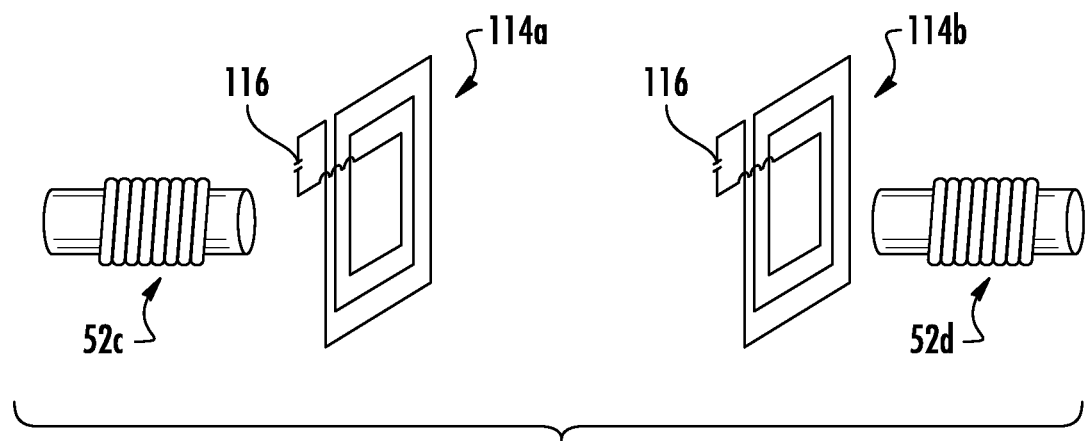
FIG. 12 is a diagram of a pair of near field communication coils and a pair of flux concentrators positioned adjacent respective ones of the coils.

The wire loops of the flux concentrators 114 in FIG. 12 are arranged in generally square shapes. The length of each side of the square shapes is generally indicated by the letter D. In order to work most effectively, flux concentrator 114a should be positioned within a distance of ½*D of first coil antenna 52c. Similarly, flux concentrator 114b should be positioned within a distance of ½*D of second antenna coil 52d. If the wire loops of flux concentrators 114 are arranged in circles, then the distance D will correspond to the diameter of the circles, and the adjacent antenna coil 52 should be positioned within half of that diameter. If the flux concentrators are rectangular shapes, or otherwise shaped with sides of unequal length, the adjacent antenna coil may need to be positioned within half of the length of the shortest side, although satisfactory results may be possible at greater distances. While the various drawings herein show the flux concentrator 114 positioned between the transmitting coil 52 and the receiving coil, it will be understood that the flux concentrator could be positioned behind the receiving coil 52—that is, located such that the concentrator 114 was positioned on a side of the receiving coil 52 opposite the transmitting coil 52.

Although FIG. 12 and several of the other figures show flux concentrators 114 as closed circuits with a capacitor, it will also be understood by those skilled in the art that conventional Radio Frequency (RF) ID cards can also be used as flux concentrators. In one embodiment, a Tag-it HF-I Pro Transponder having the part number RI-I11-114A-01 available from Texas Instruments of Dallas, Tex. was found to provide suitable results. Other types of transponders, or other different types of constructions of flux concentrators 114, may be used.

In the arrangement shown in FIG. 12, second flux concentrator 114b assists second coil antenna 52d in receiving near field transmissions sent from first coil antenna 52c. Similarly, first flux concentrator 114a assists first coil antennas 52c in receiving near field transmissions sent from second coil antenna 52d. If only one way communication is desired between coils 52c and 52d, then the flux concentrator 114 next to the transmitting coil 52 could be eliminated, if desired. It may also be desirable to use only a single flux concentrator in other instances as well. For example, in some cases, one of the coil antennas 52c or 52d could be powered by a battery source of power while the other of the coil antennas 52c or 52d could be powered by a connection to a mains outlet. In such instances, it may be desirable to use less power for transmissions from the battery-powered coil antenna 52, while using more power for the mains-powered coil antenna 52. Accordingly, for these instances, a single flux concentrator 114 could be positioned next to the mains-powered coil 52 so that the weaker-powered signals transmitted from the battery-powered coil could be detected. Other situations may also warrant only a single flux concentrator, including, but not limited to, the situation where the coils 52 are so close together that a single flux concentrator 114 could concentrate flux for both coil antennas 52

The arrangement and construction of flux concentrators 114 in FIG. 12 illustrates one manner for implementing the flux concentrators 114 used in the cot 820 of FIG. 11. Further, it will be understood by those skilled in the art that flux concentrators 114 could be added to any of the patient support apparatus embodiments discussed previously that use near field communication. Thus, any of patient support apparatuses 20, 120, 220, 320, 420, 520, 620, and 720 (as well as other discussed below) could be modified to include one or more flux concentrators 114 to increase the flux concentrations adjacent to the antenna coils 52 within, or coupled to, transceivers 48. For those patient support apparatus embodiments having multiple transceivers 48, such as support apparatuses 320, 420, and 520 of FIGS. 4, 5, and 6, respectively, the support apparatus would, in some embodiments, include multiple flux concentrators 114—one positioned adjacent to each coil of transceivers 48. Flux concentrators 114 could also be including within medical devices 72, furniture 78, footboard 34, and/or mattress 36.

Figure 13:
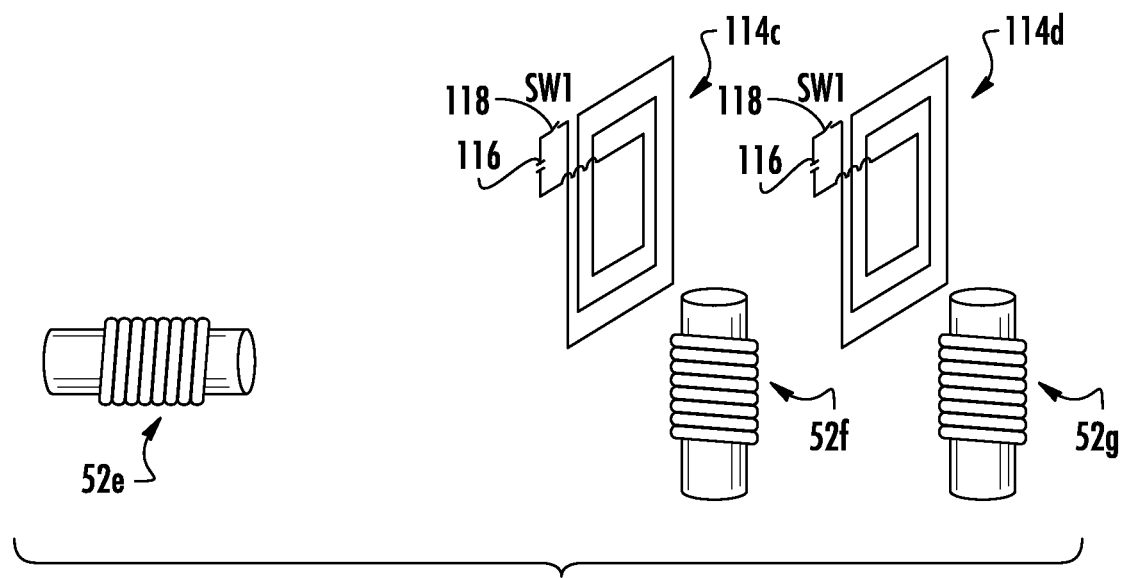
FIG. 13 is a diagram of three near field communications coils and a pair of flux concentrators that may be used in a switching manner to selectively allow and disallow communication between one or more of the coils.

FIG. 13 illustrates another arrangement of antenna coils 52 and flux concentrators 114 that could be used in one or more of the patient support apparatus embodiments discussed herein. More specifically, the arrangement of FIG. 13 illustrates three antenna coils 52 wherein the flux concentrators can be used to selectively allow and disallow communication between certain ones of the antennas 52. The arrangement of FIG. 13 includes a transmitting coil antenna 52e and two receiving coil antennas 52f and 52g. The two receiving coil antennas 52f and 52g are oriented parallel to each other, but perpendicular with respect to transmitting coil antenna 52e. This means that, in the absence of flux concentrators 114 (as explained below), any near field transmissions from transmitter coil 52e will not be detected by coils 52f or 52g because the lines of magnetic flux from coil 52e will generally not pass through the center or the coils 52f and 52g in a direction aligned with the axes of coils 52f and 52g. However, because flux concentrators 114c and 114d are each oriented at approximately a forty-five degree angle with respect to coil 52e (and coils 52f and 52g), each flux concentrator 114c and 114d will concentrate flux in a manner that enables coils 52f and 52g to detect these transmissions. Flux concentrators 114c and 114d therefore enable communication between antennas 52 that have misaligned axes.

Still further, flux concentrators 114c and 114d each have a switch 118 that is capable of being opened or closed. When the switch 118 is open, the flux concentrator 114 ceases to concentrate flux, thereby providing no assistance to the nearby antenna 52f or 52g in detecting transmissions from coil 52e. Consequently, because of this lack of assistance and because of the perpendicular alignment of antennas 52f and 52g with respect to antenna 52, no near field communication can take place between coil 52e and the coil whose flux concentrator 114 has its switch 118 opened. One or more controllers (not shown) can be coupled to one or both of switches 118 of concentrators 114c and 114d in order to selectively control when each flux concentrator 114 is active or inactive. By turning on and shutting off flux concentrators 114c and 114d at appropriate times, the controller or controllers can control which antenna 52f or 52g is able to receive (or transmit) near field communications from (or to) antenna coil 52e. In some instances, it is desirable for only one coil 52f or 52g to communicate with coil 52e at a time, while in other instances it is desirable for both coils 52f and 52g to either be able to simultaneously communicate with coil 52e or for both coils 52f and 52g to not be able to communicate with coil 52e. This can be easily accomplished through the control of switches 118. The arrangement of coils 52e, f, and g of FIG. 13 may be used in any patient support apparatus, medical device, piece of furniture, mattress, or other device that communicates therewith where it is desirable to control the ability of coils 52 to communicate with each other. Further, while FIG. 13 shows two coils 52f and 52g, in some instances it may be desirable to selectively control the communication between only a single pair of coils (e.g. 52e and 52f), or between more than the three coils shown in FIG. 13.

Figure 14:
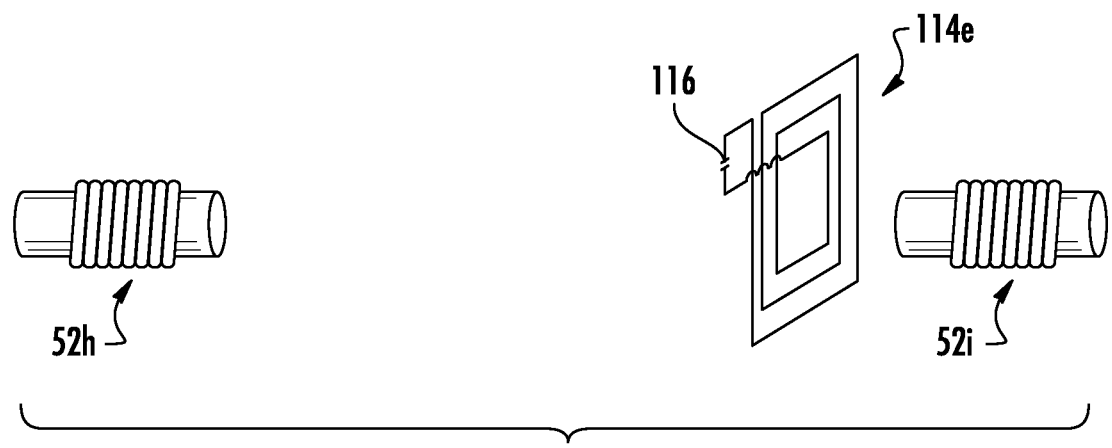
FIG. 14 is a diagram of a pair of near field communication coils and a magnetic flux concentrator whose angular orientation with respect to one of the coils may be changed.

FIG. 14. illustrates an arrangement of a pair of antenna coils 52h and 52i and a flux concentrator 114e. Flux concentrator 114e is shown a being angularly pivotable with respect to antenna 52h and 52i. Depending upon the angle of flux concentrator 114e with respect to antenna 52h, the voltage detected at antenna 52i due to near field transmissions from antenna 52h will vary. Therefore, by measuring the detected voltage at receiver 52i, the angle of concentrator 114e can be determined. Concentrator 114e may be positioned inside of, or attached to, a component that is movable and whose orientation is desirably known. The arrangement of FIG. 14 allows this angular orientation to be determined through the use of near field antennas 52h and 52i.

Figure 15:
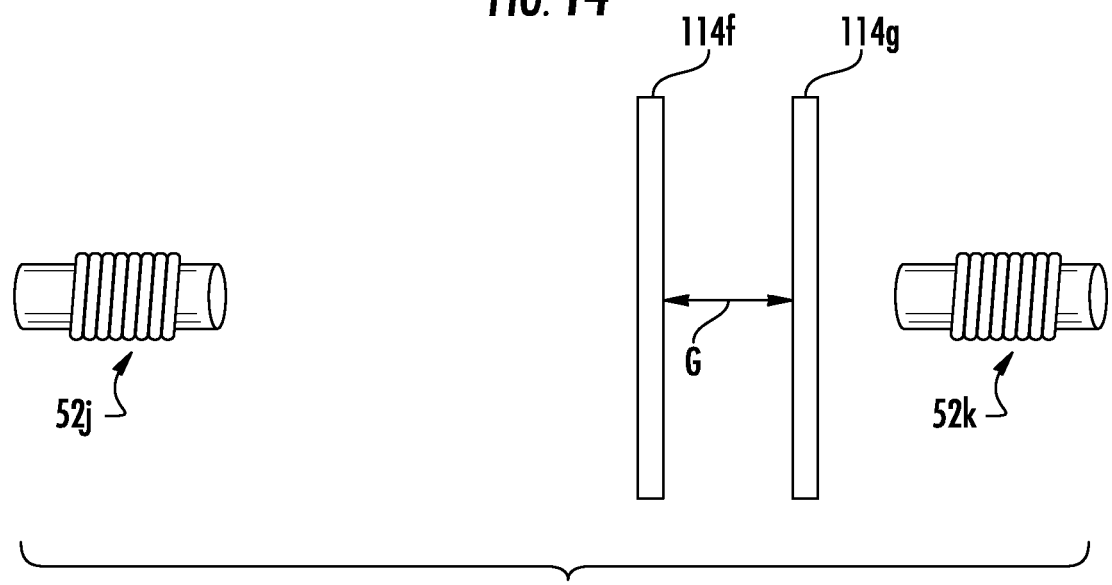
FIG. 15 is a diagram of a pair of near field communication coils and a pair of magnetic flux concentrators having a gap therebetween that may be changed.

FIG. 15 illustrates an arrangement of a pair of coil antennas 52j and 52k, as well as a pair of flux concentrators 114f and 114g. Flux concentrators 114f and 114g are arranged in a generally parallel fashion and spaced apart by a gap G. When gap G has a specific magnitude—the actual numeric value of which will depend upon the frequency at which the near field communications are taking place, as well as the dimensions of concentrators 114f and 114g—the pair of flux concentrators 114f and 114g will prevent all near field communications transmitted from antenna 52j from being detected at antenna 52k. When the value of gap G is changed from this specific blocking distance, such near field communications transmitted from antenna 52j to antenna 52k will once again be detectable at antenna 52k. Antenna coils 52j and 52k can therefore be used to determine if concentrators 114f and g, or objects coupled to concentrators 114f and 114g, are positioned at a desired distance from each other by monitoring the signal strength.

Figure 16:
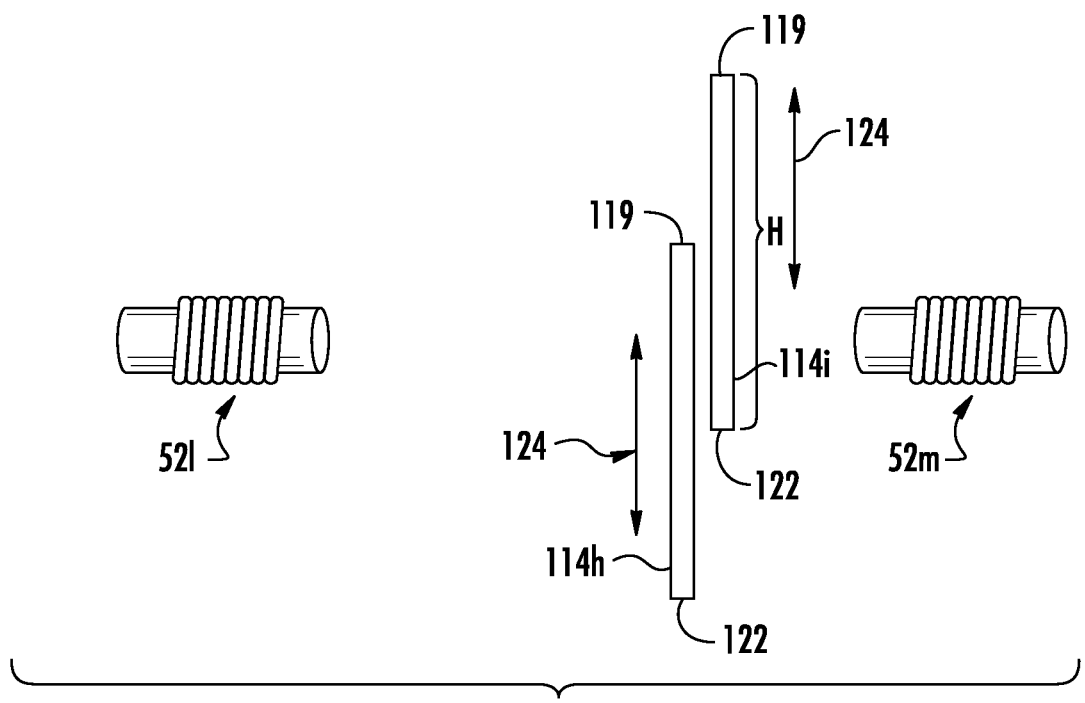
FIG. 16 is a diagram of a pair of near field communication coils and a pair of magnetic flux concentrators that translate with respect to each other in parallel planes.

FIG. 16 illustrates an arrangement of a pair of coil antennas 52l and 52m, as well as a pair of flux concentrators 114h and 114i. Coils 52l and 52m are each arranged with their axes oriented generally parallel and aligned. Thus, assuming they are within near field communication distance of each other, they will be able to transmit and/or receive near field communications to and from each other. However, this ability to communicate via near field communication will depend upon the relative position of flux concentrators 114*h* and 114*i* with respect to each other. As shown, flux concentrators 114*h* and 114*i* are generally planar and oriented so that their planes are parallel to each other. Depending upon the relative alignment of concentrators 114*h* and 114*i*, the near field communication between coil antennas 52*l* and 52*m* can be selectively allowed or stopped.

Each flux concentrator 114*h* and 114*i* in FIG. 16 includes an upper edge 119 and a lower edge 122. Further, each flux concentrator 114*h* and 114*i* has a height of H. Together, concentrators 114*h* and 114*i* will block near field communication from coil 52*l* to coil 52*m* if the bottom edges 122 are displaced by more than half of the height H in the direction 124. That is, if bottom edge 122 of concentrator 114*i* is moved upwardly in direction 124 to a point greater than the midpoint of the height H of concentrator 114*h*, this misalignment of the two concentrators will stop magnetic flux from coil 52*l* from being delivered to coil 52*m*. Similarly, if the top edges 119 of concentrators 114*h* and 114*i* are displaced by more than half of the height H in the direction 124, this will also stop such near field communication. Coils 52*l* and 52*m* can therefore be used to detect the relative position of concentrators 114*h* and 114*i*, or the relative positions of objects coupled to concentrators 114*h* and 114*i*.

Figure 17:
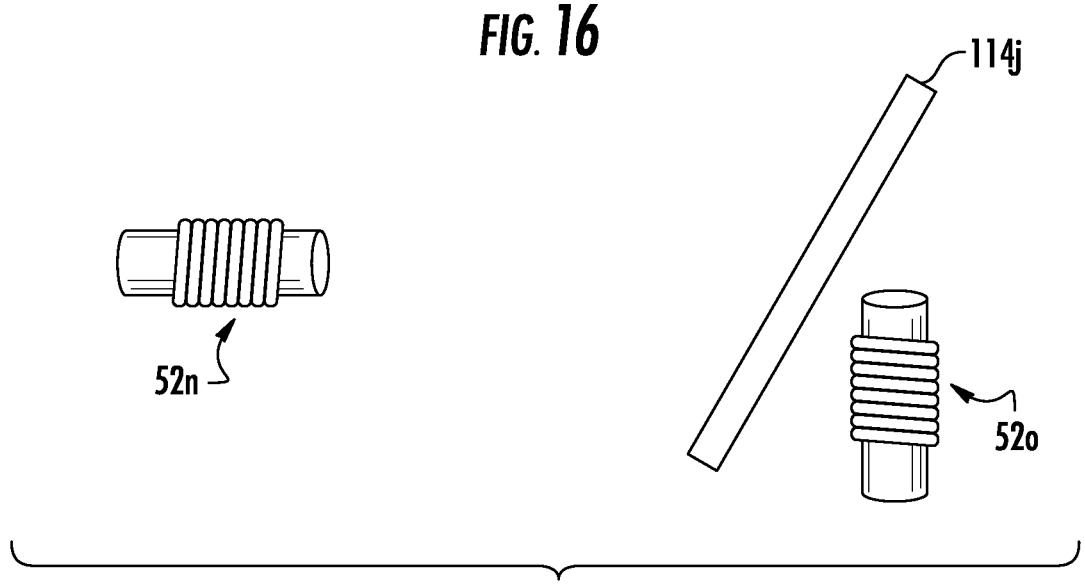
FIG. 17 is a diagram of a pair of perpendicularly oriented near field communication coils and a magnetic flux concentrator that is used to allow communication between the two coils while they are perpendicularly oriented.

FIG. 17 shows another arrangement of coil antennas 52*n* and 52*o*, which are separated by a flux concentrator 114*j*. Coils 52*n* and 52*o* are arranged with their axes oriented at approximately ninety degrees with respect to each other. As such, they are generally incapable of communicating via near field communications in the absence of flux concentrator 114*j*. By adding concentrator 114*j*, near field communication is able to take place between the two coils 52*n* and 52*o*. The addition of one or more flux concentrators 114 therefore improves and/or enables near field communications between antenna coils that are not able to be aligned. This can be useful in any of the patient support apparatus embodiments discussed above where, due to physical constraints and/or for other reasons, it may not be possible to ensure a sufficient degree of axial alignment between the antenna coils 52 of the communicating transceivers. By adding one or more concentrators 114 positioned at suitable locations and with suitable orientations, communications between the transceivers 48 can be enabled and/or improved.

The arrangements of the flux concentrators 114 in any of FIGS. 12-17 may be used in any suitable manner on any of the patient support apparatus embodiments discussed herein. For example, one suitable use for the arrangement of FIG. 16 is to use near field coils 52*l* and 52*m*, along with concentrators 114*h* and 114*i*, to determine whether an X-ray cartridge is properly aligned with an X-ray transmitter used to take X-rays of a patient positioned on a support apparatus, such as, for example, a stretcher. The concentrators may also be used to determine the alignment of the body portion of the patient lying on the stretcher with the X-ray. Specific details of a stretcher configured to accommodate X-ray cartridges, and which can be modified to include the concentrators 114 and near field coils 52 disclosed herein, are disclosed in commonly assigned U.S. provisional patent application Ser. No. 13/736,396 filed Jan. 8, 2013 by applicant Matthew Brougham and entitled X-RAY COMPATIBLE PATIENT SUPPORT APPARATUS, the complete disclosure of which is hereby incorporated by reference herein.

One or more flux concentrators 114 may also be used to assist in the inductive communication and/or inductive power transfer between a cot and a trolley and/or between a cot and a loading device for the cot that assists in the loading and unloading of the cot into and out of emergency vehicles. For example, one or more flux concentrators 114 could be coupled to the cot disclosed in commonly assigned U.S. patent application Ser. No. 12/886,987 filed Sep. 21, 2010 by applicants Clifford Lambarth et al., and entitled AMBULANCE COT AND LOADING AND UNLOADING SYSTEM, the complete disclosure of which is hereby incorporated herein by reference. More particularly, one or more flux concentrators may be positioned between the primary and second coils identified by the reference number 230 and 232 in the '987 application, or between the coils 234 and 236 identified therein.

The flux concentrators 114 shown in the accompanying drawings may be modified to include different shapes than those shown herein. In addition to different shapes of the individual coils formed by the conductors of concentrators 114, the generally planar shape of concentrators 114 may also be altered in order to improve or otherwise change their flux concentrating characteristics. As one example, the flux concentrators 114 may be altered to have a non-planar shape that generally matches a portion of a sphere. Such partially spherical shapes may be useful where the precise location of one coil antenna 52 with respect to the other antenna coil 52 is not known, or is variable. Such variability happens in the situation where coils 52 are included inside of one of the patient support apparatuses for detecting medical devices 72 and/or pieces of furniture 78, such as has been discussed above with respect to FIGS. 4-6. The precise position of the medical device 72 or piece of furniture 78 with respect to the patient support apparatus will depend upon where there caregiver positions the medical device, furniture, and/or patient support apparatus. In order to allow the near field transceivers 48 on the support apparatus to be able to sufficiently communicate via near field communications regardless of the precise orientation and position of the coil antennas 52, one ore more flux concentrators 114 may be incorporated into the patient support apparatus, and such concentrators 114 may be non-planar. Further, more than one flux concentrator 114 may be used for a single coil antenna 52 in order to broaden the range and direction which the coil antenna 52 is able to receive near field transmissions. In some embodiments, flux concentrator 114 is shaped like a plurality of surfaces of a dodecahedron, or other multi-surface solid. That is, the flux concentrator has multiple non-parallel planes. In such configurations, each plane may be a separate set of electric loops that are electrically isolated from the loops of the other planes, or the loops from the multiple planes may be electrically coupled together. Still further, the medical device 72 and/or pieces of furniture 78 may likewise include such non-planar flux concentrators 114, including multiple flux concentrators 114 for each coil antenna 52. In yet other embodiments, each near field transceiver may include, or be in electrical communication with, multiple coil antennas 52 which are positioned in different locations and/or oriented at different orientations, so as to ensure that at least one of the multiple coil antennas 52 will be able to communicate properly with the one or more antennas 52 that are coupled to the other device or structure.

Figure 18:
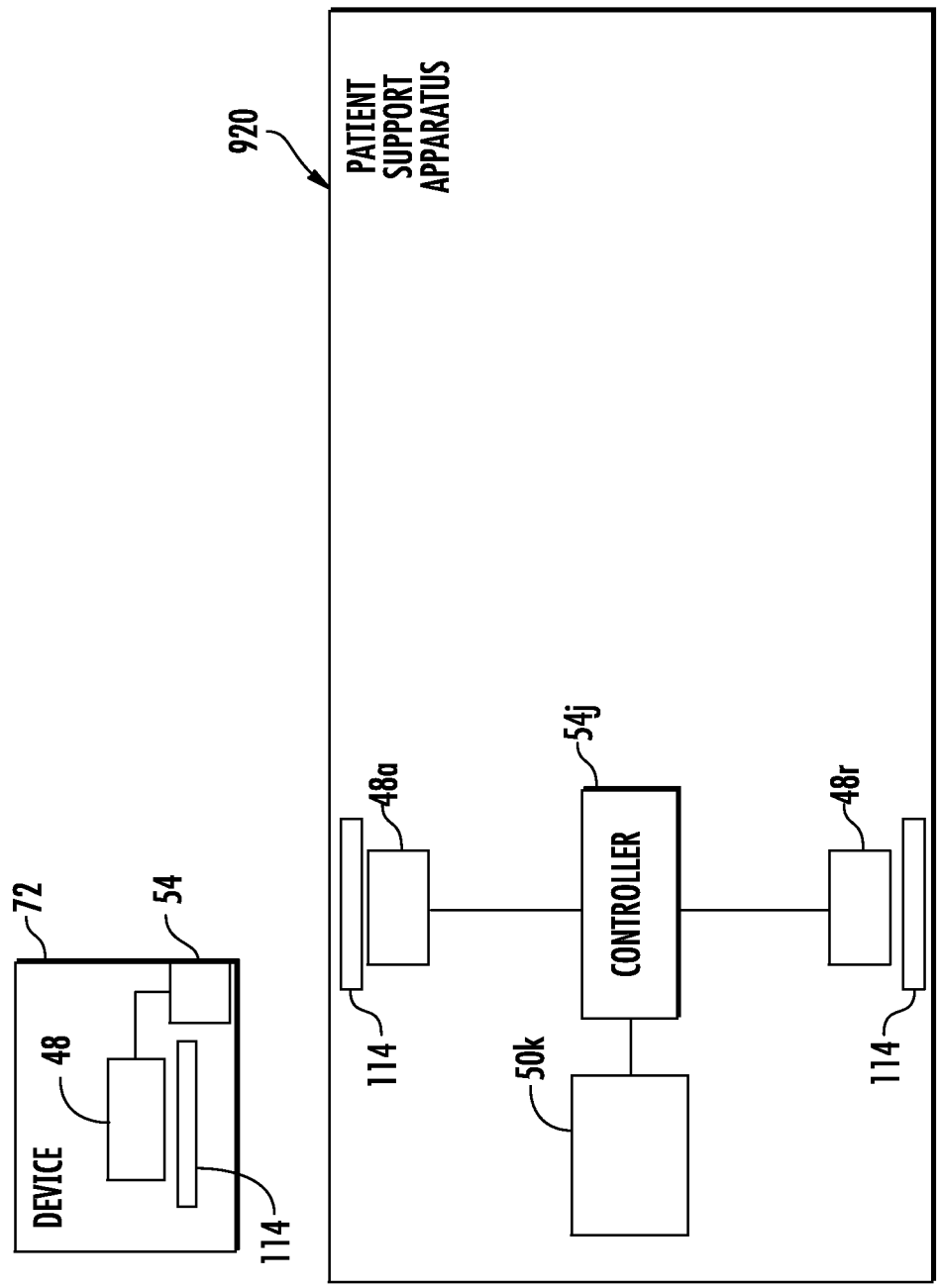
FIG. 18 is a plan view diagram of a patient support apparatus and device similar to that shown in FIG. 5 but with a plurality of magnetic flux concentrators added.

FIG. 18 illustrates another embodiment of a patient support apparatus 920 that includes a controller 54*j*, a pair of near field transceivers 48*q* and 48*r* (each having, or in communication with, one or more antenna coils 52 (not shown)), and a far field transceiver 50*k*, all of which are in electrical communication with each other. Support apparatus 920 is the same as, and operates in the same manner as, patient support apparatus 320 (FIG. 4) with the exception that support apparatus 920 includes a plurality of flux concentrators 114. Further, medical device 72, which is adapted to communicate via near field communications with patient support apparatus 920 (when they are in range of each other), includes one or more flux concentrators 114. Other than these flux concentrators 114, support apparatus 920 and medical device 72 operate in the same manner as described above. In brief overview, if the two are within near field range of each other, then patient support apparatus 920 will associate the two. Data indicating this association is then shared between the two, forwarded to a server or application running on the healthcare facility's computer network, used to correlate data from medical device 72 with a specific patient, and/or for other purposes.

While FIG. 18 illustrates only a single flux concentrator 114 positioned adjacent to each near field transceiver 48, it will be understood that, as mentioned above, multiple flux concentrators 114 could be used for each transceiver. Such multiple flux concentrators 114 could be used to extend the communication range of the near field transceivers 48, including shaping the range in any one or more of the vertical, longitudinal, and lateral directions. Such concentrators could be planar, as shown in the attached drawings, or non-planar, as well as multi-planar. While FIG. 18 illustrates one specific example of the use of flux concentrators on a patient support apparatus, it will be understood that any of the patient support apparatuses described in FIGS. 1-10 could include flux concentrators next to the near field antennas 52.

Figure 19:
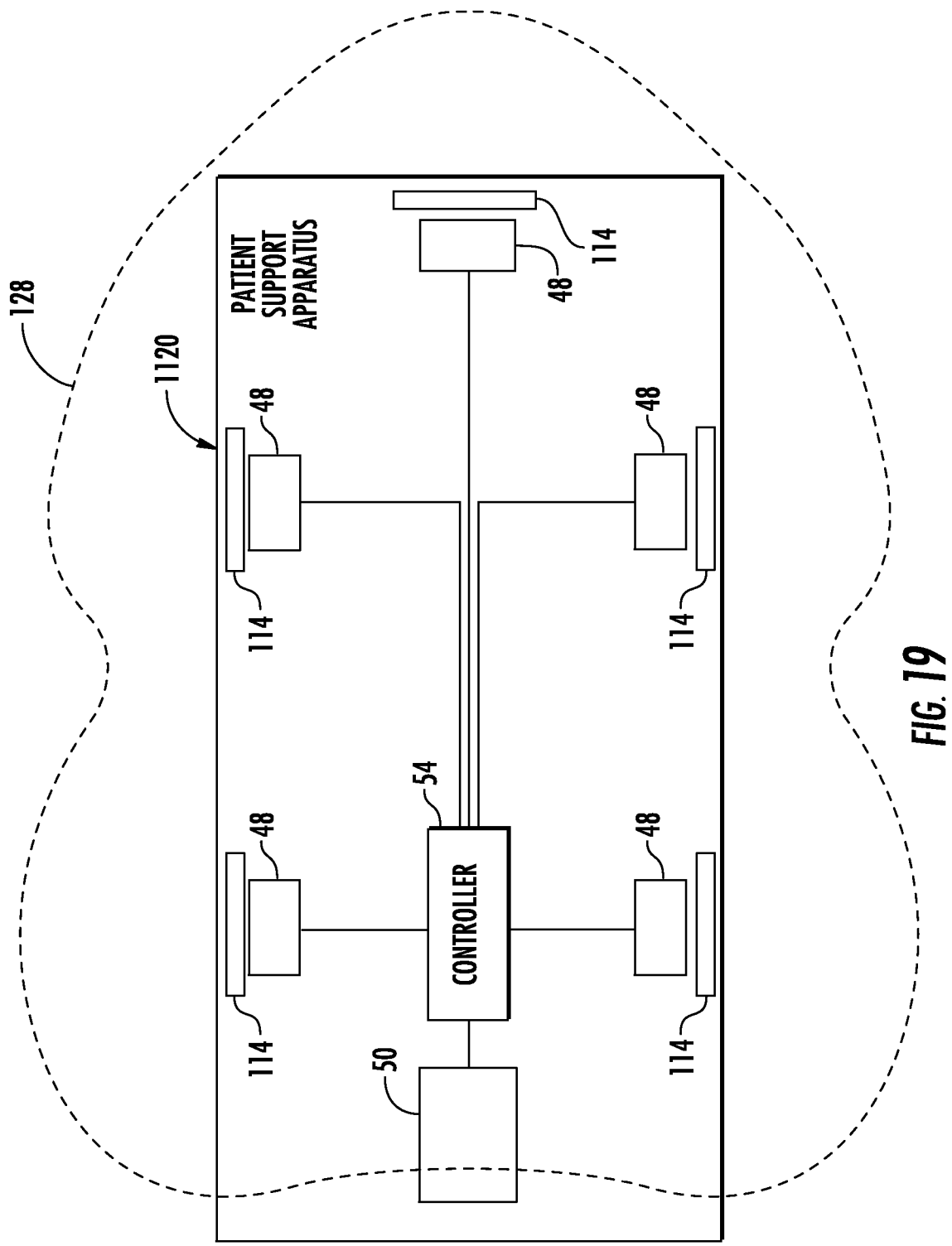
FIG. 19 is a plan view diagram of a patient support apparatus illustrating an arbitrary and configurable range for near field communication.

FIG. 19 illustrates another patient support apparatus 1020 having a plurality of near field transceivers 48 (each having, or in communication with, one or more antenna coils 52 (not shown)), each of which is in communication with a controller 54, and each of which includes at least one associated flux concentrator 114. Controller 54 is also shown to be in communication with a far field transceiver 50. FIG. 19 further illustrates a near field communication range 128 that represents the total near field communication range of patient support apparatus 1020. That is, range 128 represents the outer physical distance from support apparatus 1020 that support apparatus 1020 is able to communicate via near field communications using near field transceivers 48. Range 128 is therefore the cumulative range of all of the individual ranges of each near field transceiver 48.

Near field range 128 also represents, as discussed above, the physical area where, if a medical device 72, piece of furniture 78, or other structure having near field communications is positioned, patient support apparatus 1020 will either automatically associate that structure with patient support apparatus 1020, or suggest such an association to a caregiver (such as, for example, via a screen or other user interface that is part of support apparatus 1020). Such association is carried out in the manners discussed above. Further, once the association is established, subsequent communications can be used to periodically reconfirm the association.

The size and/or shape of near field range 128 shown in FIG. 19 is arbitrary. This size and shape can be modified through multiple different techniques. First, the number of near field transceivers 48 can be changed. Second, the position and/or arrangement of the near field transceivers 48 can be arranged. Third, the electrical power supplied to the near field transceivers 48—either individually or collectively—can be changed. Fourth, the number, configuration, and position of the flux concentrators 114 can also be changed. Through the appropriate selection of these multiple variables, a patient support apparatus 1020 may be constructed such that its near field communication range 128 has the precise size and shape for a given implementation. This also gives the manufacturer of the support apparatus control over what positions medical devices 72, furniture 78, and/or other structures need to be in order for the patient support apparatus to associate itself with the device, furniture, or other structure.

The ability to control the size and shape of near field communication range 128 is applicable to all of the patient support apparatuses disclosed herein. That is, the size and shape of the near field communication ranges of any the of support apparatuses discussed herein may be changed by changing the number, location, and/or power supplied to near field transceivers 48, as well as the number, position, and/or configuration of one or more flux concentrators 114. Thus, it will be understood the number, position, and orientation of the near field transceivers 48 and/or flux concentrators 114 shown in the drawings may be changed, as suitable.

Figure 20:
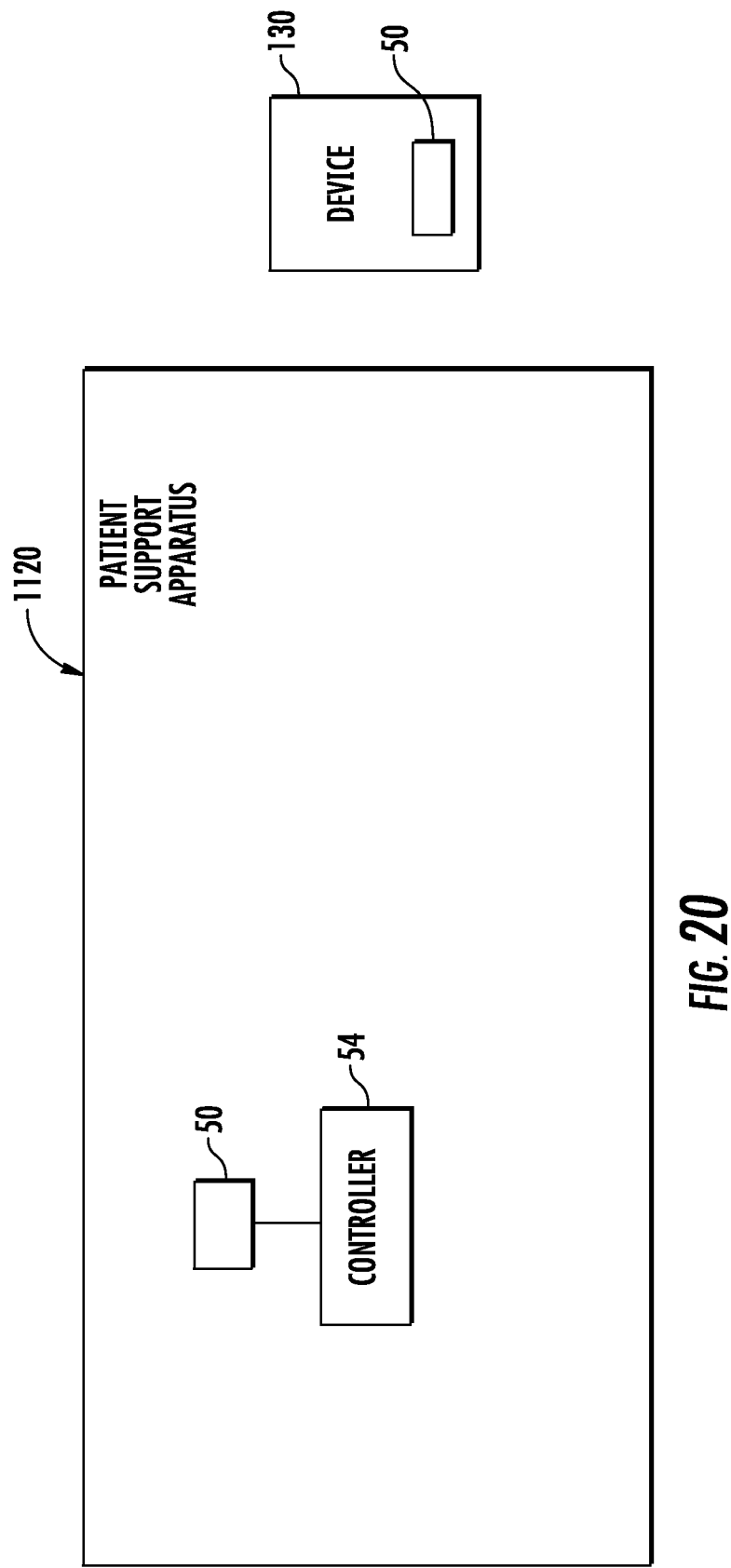
FIG. 20 is a plan view diagram of a patient support apparatus and device according to yet another embodiment.

FIG. 20 illustrates another patient support apparatus 1120 which is configured to associate itself with one or more devices 130 using far field communications. Thus, as illustrated, patient support apparatus 1120 includes no near field transceivers 48 that are used for determining whether to associate itself with a device 130. Device 130 may be a medical device 72, a piece of furniture 78, or any other structure for which it is desirable to associate with patient support apparatus 1120 when it is positioned within a physical proximity to support apparatus 1120. Patient support apparatus 1120 includes a controller 54 that is electrically coupled to a far field transceiver 50. Controller 54 determines whether any devices 130 are within a physical proximity to support apparatus 1120 by broadcasting an interrogation message at a very low power so that only responsive device (e.g. such as device 130) that are very close to support apparatus 1120 will detect the message and respond. Controller 54 is configured to send this initially low power interrogation message and then wait for responses. If no responses are detected, controller 54, in some embodiments, is programmed to send another interrogation message at a slightly higher power level, thereby increasing the range slightly. Such repeated transmissions of interrogation messages at increasing levels of power can be continued until a maximum desired range is reached. If no responses are received from any of the multiple messages that have been transmitted, then no devices are within close enough physical proximity to justify making an association.

If a device 130 is positioned sufficiently close to support apparatus 1120 such that it responds to one or more of the interrogation messages, then support apparatus 1120 is configured to take any of the subsequent steps described above in the various patient support apparatus embodiments that associate devices to the support apparatuses. In general, that is, support apparatus 1120 is configured to either automatically associate itself with device 130, or suggest such an association to a caregiver for him or her to manually confirm or deny. Further, once such an association is made, repeated interrogations and responses between support apparatus 1120 and device 130 may be made in order to continually validate the association. Other information may also be exchanged via far field transceivers 50 on support apparatus 1120 and device 130, including, but not limited to, patient data, alerts, IDs, and the like.

In addition to, or in lieu of, the devices 72, furniture 78, mattress 36, footboard 34, and/or any of the other structures discussed above, any of the near field transceivers 48 in any of the patient support apparatus embodiments discussed above may also be designed to communicate with one or more RF ID tags. Such RF ID tags may be conventional RF ID tags that are commercially available from multiple sources. Such RF ID tags may be worn by caregivers, patients, or attached to medical devices or other structures. Depending upon which types of RF ID tags a patient support apparatus is intended to detect, suitably positioned near field transceivers 48 (in sufficient number) are incorporated into the patient support apparatus so that detection of the RF ID tags is ensured when they are positioned within a desired proximity to the support apparatus. When the RF ID tag is worn by a patient lying or sitting on the patient support apparatus, the near field transceivers 48 will be able to detect the RF ID, read the ID associated with the RF ID, and use the ID information to correlate other information to it. Such other information may include the patient support ID, the current location of the patient support, the ID of any one or more other devices that are already associated with the patient support apparatus, or still other information. After the RF ID tag is read, far field transceiver 50 is programmed, in some embodiments, to communicate with a computer on wheels (COW) or a mobile device carried by a caregiver, so that the device can use the ID to retrieve the patient medical records, billing records, or other information associated with the specific patient supported on the patient support apparatus. Further, such retrieval of information can happen automatically after the COW or mobile device has associated itself with the patient support apparatus via near field communication so that the caregiver carrying the mobile device, or using the COW, will not have to manually retrieve medical records for a particular patient when they approach that patient's bed. Instead, such records can be brought up automatically.

When the near field transceivers 48 are configured to detect RF ID tags worn by caregivers, controller 54 of the patient support apparatus (any embodiment) is programmed to take one or more specific actions automatically when the nearby presence (within near field range) of a caregiver is detected. Such specific actions could include turning on the ability of the patient support apparatus to implement powered movement. That is, in some embodiments, the patient support apparatus is equipped with one or more motors that assist in the movement of the support apparatus from one location to another. One example of such a patient support apparatus is disclosed in commonly assigned, U.S. pat. application Ser. No. 61/702,316, filed Sep. 18, 2012, by applicants Richard A. Derenne et al., and entitled POWERED PATIENT SUPPORT APPARATUS, the complete disclosure of which is hereby incorporated herein by reference. More specifically, in at least one embodiment, near field transceivers 48 are used to read, and determine the location of, the RF ID worn by the caregiver in step 72 of the algorithm disclosed in this commonly assigned patent application. This can be done with or without the use of one or more flux concentrators 114. Once the presence of any caregiver-worn RF ID tag is no longer detected by near field transceivers 48, then controller 54 will disable the powered movement ability of the patient support apparatus. In this manner, unintended movement of the patient support apparatus by individuals not authorized to move the support apparatus, or otherwise not familiar with the controls of the patient support apparatus, are prevented or avoided.

Controller 54 of the patient support apparatus (any embodiment) can also be programmed to take—either in addition to, or in lieu of, the powered movement activation and deactivation mentioned above—the step of turning on and turning off one or more other sensors on the patient support apparatus based upon the detection, or absence, of any caregiver-worn RF IDs, as determined by the one or more near field transceivers 48 positioned on the patient support apparatus. For example, commonly assigned U.S. patent application Ser. No. 13/767,943, filed by Donna-Marie Robertson et al. on Feb. 15, 2013 and entitled PATIENT SUPPORT APPARATUS AND CONTROLS THEREFOR (the complete disclosure of which is hereby incorporated herein by reference), discloses a patient support apparatus having load cells, gesture sensors, and/or other sensors, that may be manipulated to control one or more aspects of the patient support apparatus. In some situations, it is desirable to automatically shut off the functionality of one or more of those controls when no caregiver is positioned within the vicinity of the patient support apparatus, while in other situations it is desirable to automatically turn on the functionality of those controls when a caregiver is present. Near field transceivers 48 and controller 54 can be used to detect the presence of an RF ID tag worn by a caregiver and, depending upon its presence or absence, turn on or off any of the controls described in the '099 application, which may be incorporated into any of the patient support apparatus embodiments discussed herein. One algorithm for implementing this is discussed below with respect to FIG. 22.

Near field transceivers 48 are also able, in any of the patient support apparatus embodiments discussed herein, to have controller 54, or another controller in communication with near field transceivers 48, automatically turn on or off one or more patient care protocols that are carried out, or monitored by, the patient support apparatus. Patient support apparatuses that are adapted to assist in compliance with one or more patient care protocols are disclosed in commonly assigned U.S. patent application Ser. No. 13/570,934 filed Aug. 9, 2012 by applicants Michael Hayes et al. and entitled PATIENT SUPPORT WITH IN-ROOM DEVICE COMMUNICATION, the complete disclosure of which is hereby incorporated herein by reference. The activation, de-activation, or monitoring of these patient care protocols can be based, either wholly or partially, upon the detection of a near field communication device that is within near field communication of the patient support apparatus. Thus, any of the patient support apparatuses disclosed herein can be modified to include the patient care protocol functions disclosed in the '934 application, and the near field transceivers can be used to turn on, off, or carry out these protocols. Such turning on or off of these protocols can be carried out via control algorithm 171 discussed below.

As but one example of automatically adjusting patient care protocols, near field transceivers 48 are used to detect the nearby presence (within near field ranges 128) of a ventilator. After detecting the nearby ventilator, controller 54, or another controller on board the patient support apparatus, is configured to automatically implement the patient care protocol that seeks to reduce the risk of ventilator associated pneumonia. This includes, among other things, monitoring the angle of the head section 38 of the support deck 30 with respect to horizontal and ensuring that this angle does not decrease below a threshold. Controller 54 may also automatically implement, terminate, or monitor the progress of other patient care protocols based upon the detection of RF ID tags worn by caregivers or patients, or attached to equipment, or the detection of other non-RF ID tags that utilize near field communication. Such other patient care protocols include, but are not limited to, fall prevention protocols, caregiver hand washing compliance protocols, dialysis protocols, patient turning protocols, and others.

Figure 22:
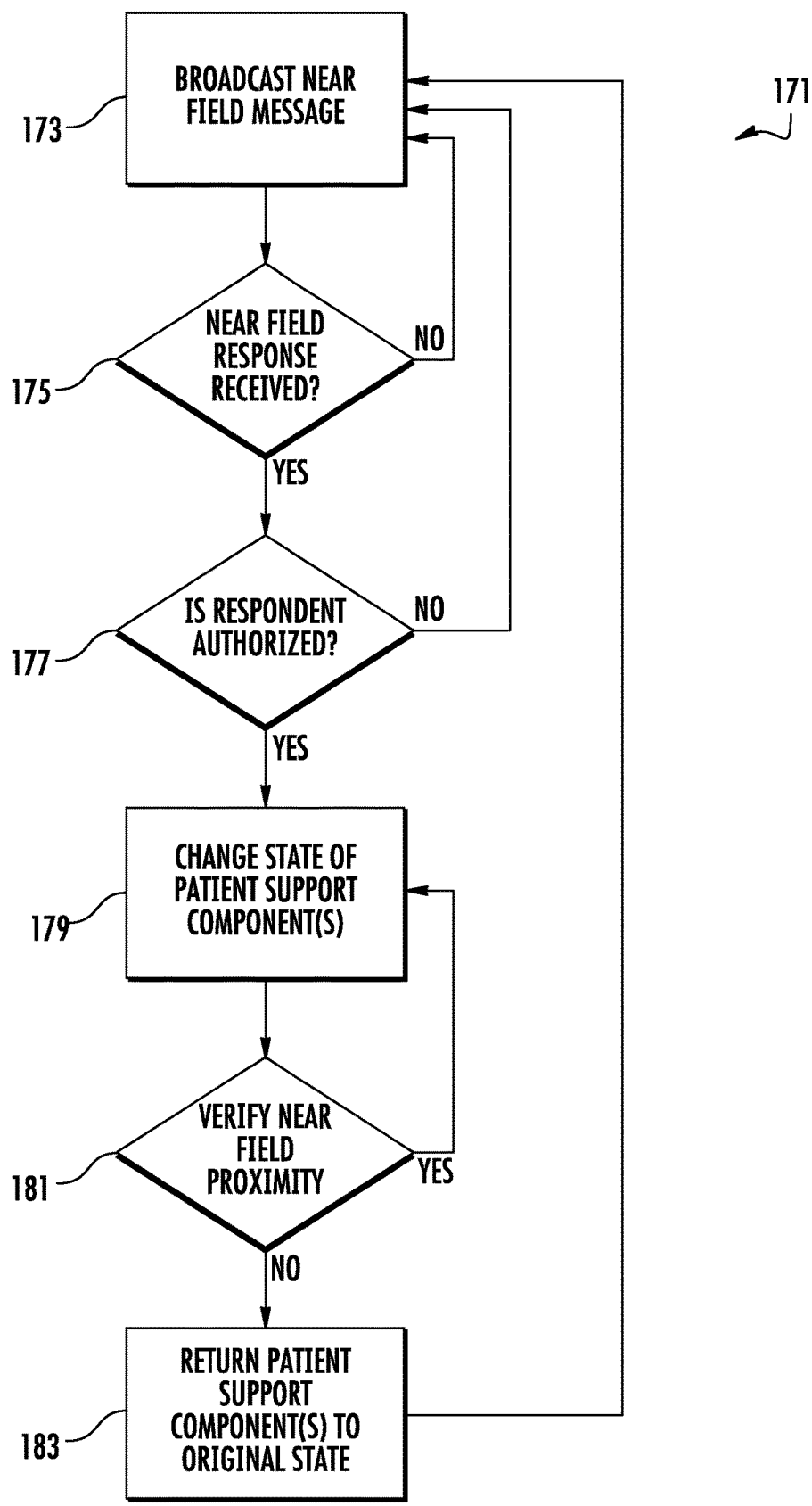
FIG. 22 is a flow chart of an illustrative control algorithm that may be used with any of the patient support apparatuses disclosed herein.

FIG. 22 illustrates one version of a control algorithm 171 that is usable by any of the patient support apparatus embodiments discussed herein. Control algorithm 171 is carried out by controller 54, either alone or in conjunction with one or more controllers that are positioned on the patient support apparatus. Control algorithm 171 is used to change a state of the patient support apparatus based upon the detection of a near field transceiver that has the proper authorization for changing that particular state. As noted above, the state of the patient support apparatus that is changed is, in some embodiments, the turning on or off of one or more sensors, or the changing of one or more patient care protocols. In addition to these, the change in state includes changes to the accessibility of data stored on the patient support apparatus. For example, the nearby presence of a caregiver wearing an appropriate RF ID tag (having a near field transceiver) will cause the patient support apparatus to change states such that the control panel will display patient information that would otherwise be confidential in the absence of the authorized caregiver. As another example, an authorized technician wearing an RF ID tag (having an ID indicative of his or her status as a technician) will cause the patient support apparatus to change to a state where maintenance and/or usage data regarding the patient support apparatus is available via the one or more user interfaces. In this manner, authorized individuals wearing the appropriate RF ID tags automatically gain access to functions and/or data when they are present and in the vicinity of the patient support apparatus, and such access is automatically shut off after they move out of the vicinity of the patient support apparatus.

Control algorithm 171 starts at step 173 where controller 54 broadcasts a near field message. At step 175, controller 54 monitors its associated antenna for any near field responses to the message it broadcast at step 173. If no responses are received, then control returns to step 173, where another near field message is broadcast. If controller 54 receives a valid response to its near field message at step 175, it determines the authorization level, if any, of the respondent. That is, the respondent's message includes an identifier of the type of device the respondent is. If the respondent is a medical device, furniture, mattress, or some other piece of equipment, then controller 54 returns to step 173. However, if the ID of the respondent corresponds to a near field transceiver carried or worn by a caregiver or authorized personnel (e.g. an appropriate RF ID card), then controller 54 proceeds to step 179 where it changes one or more states of the patient support apparatus. The changed state depends, in one embodiment, upon the type of person wearing the near field transceiver (e.g. technicians will change a different state than a caregiver). At step 181, controller 54 sends another near field message confirming that the respondent is still within near field communication distance. If it is (as determined by the receipt of a near field response message), then controller returns to step 179, where it continues to maintain the patient support apparatus in the changed state. If the respondent is no longer within near field communication distance, as determined at step 181, then controller 54 proceeds to step 183 where it returns the patient support apparatus back to the original state it was in prior to step 179. Control then returns back to original step 173. Many modifications of algorithms 171 are, of course, possible.

Any of the patient support apparatuses disclosed herein may further be configured, in some embodiments, to include one or more far field transceivers 50 that are capable of communicating via a mesh network. When so configured, the far field transceivers 50 operate in any of the manners disclosed in commonly assigned, U.S. provisional patent application Ser. No. 61/640,138 filed Apr. 30, 2012 by applicants Michael Hayes et al., and entitled PATIENT SUPPORT APPARATUS COMMUNICATION SYSTEMS, the complete disclosure of which is hereby incorporated herein by reference. One such manner includes initially communicating with other patient support apparatuses via near field communications so as to verify their nearby physical proximity. When the nearby presence of another patient support apparatus is detected via transceivers 48, communication between the two patient support apparatuses (via near of far field) is implemented to transfer data from one support apparatus to the other when transferring a patient from one support apparatus to another. Such data may include patient ID, the association of the patient with the new patient support apparatus, weight data to verify the movement of the patient off one support apparatus to the other, and still other data.

In still other embodiments, any of the patient support apparatuses disclosed herein may be configured to include a universal air and/or energy supply system such as is disclosed in commonly assigned, U.S. patent application Ser. No. 13/220,106 filed Aug. 29, 2011 by applicants Martin Stryker et al., and entitled PATIENT SUPPORT WITH UNIVERSAL ENERGY SUPPLY SYSTEM, the complete disclosure of which is hereby incorporated herein by reference. When so configured, the one or more near field transceivers 48 on the patient support apparatus are configured to detect near field RF ID cards attached to the devices that receive energy or air from the patient support apparatus, or with corresponding near field transceivers that are incorporated into such devices.

In yet other embodiments, any of the patient support apparatuses disclosed herein may further include a wireless pendant or pedestal that is adapted to be used by a patient and/or caregiver for controlling one or more aspects of the patient support apparatus. Such a pendant or pedestal may also include one or more controls for controlling various aspects of the patient room, such as a television, curtains, room lighting, or other electrical or electronic objects within the room. The pendant or pedestal includes a near field transceiver that is adapted to communicate with the near field transceivers 48 included on the patient support apparatus when the transceivers are within near field range of each other (i.e. when the pendant is within near field communication range 128). In other words, when the pendant or pedestal is within near field range of the patient support apparatus, the controller 54 on the patient support apparatus associates that pendant or pedestal with that particular patient support apparatus and carries out the controls according to what a patient or caregiver inputs via the pendant or pedestal. If the wireless pendant or pedestal is moved to within near field communication range of another patient support apparatus, it can be used to control the features of that particular patient support apparatus.

Some embodiments also include a wireless pendant that is capable of receiving and/or transmitting high definition video signals. In such cases, the patient support apparatus includes a router, gateway, or other electronic structure that is in communication with the healthcare computer network, and/or it includes a 4G cell phone mobile communication platform. In either case, the patient support apparatus has the ability to receive video signals, or other high data signals, through the wireless connection to the healthcare network or via the 4G connection. The pendant may include a display on it allowing a patient to watch videos right on the pendant. Alternatively, the pendant can be configured to either forward the video signals to a nearby television, or it can be configured to instruct controller 54 on the patient support apparatus to forward the signals directly to nearby television. In still other embodiments, the pendant may forward, or direct controller 54 to forward, the video signals to one or more display screens that are positioned at one or more locations on the patient support apparatus, such as the footboard, or one of the side rails on the patient support apparatus. The pendant associates itself with a particular patient support apparatus using near field communications in any of the manners described above.

It will be understood that the use of the term "transceiver" throughout this specification is not intended to be limited to devices in which a transmitter and receiver are necessarily within the same housing, or share some circuitry. Instead, the term "transceiver" is used broadly herein to refer to both structures in which circuitry is shared between the transmitter and receiver, and transmitter-receivers in which the transmitter and receiver do not share circuitry and/or a common housing. Thus, the term "transceiver" refers to any device having a transmitter component and a receiver component, regardless of whether the two components are a common entity, separate entities, or have some overlap in their structures.

Finally, it will be understood by those skilled in the art that any of the embodiments described above that use near field communication to establish an association between the patient support apparatus and another device can be modified to use either infrared or sonic communication in order to establish associations between the patient support apparatus and the other device.

The above description is that of various illustrative embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A patient support apparatus comprising:
 a base;
 a frame supported on said base;
 a patient support deck adapted to support a patient thereon;
 a memory in which an authorized device code is stored and a patient support apparatus ID is stored, the authorized device code identifying a device with which the patient support apparatus is authorized to communicate and the patient support apparatus ID identifying the patient support apparatus;
 a near field transceiver adapted to wirelessly communicate with the device using a near field communication protocol;
 a far field transceiver adapted to wirelessly communicate with the device using a far field communication protocol; and
 a controller adapted to transmit the patient support apparatus ID to the device using at least one of the near field and far field communication protocols and to establish communication with the device using both the near field and far field communication protocols if the controller receives a device code from the device that matches the authorized device code stored in the memory, the controller further adapted to periodically verify that the near field transceiver is still in communication with the device and to terminate using the far field communication protocol with the device if the controller is unable to verify that the near field transceiver is still in communication with the device.

2. The patient support apparatus of claim 1 wherein the device is an inflatable mattress adapted to lie on the patient support deck.

3. The patient support apparatus of claim 1 wherein the device is a removable footboard adapted to be coupled and uncoupled from the patient support apparatus.

4. The patient support apparatus of claim 1 wherein the device is a smart phone.

5. The patient support apparatus of claim 1 further including:
 a plurality of wheels coupled to the base;
 a height adjustment mechanism for raising and lowering said patient support deck with respect to said base; and
 a plurality of siderails positioned along respective sides of said patient support deck, said siderails being movable between a raised and a lowered position.

6. The patient support apparatus of claim 5 wherein the far field communication protocol has a higher data rate than the near field communication protocol.

7. A patient support apparatus comprising:
 a base;
 a frame supported on said base;
 a patient support deck adapted to support a patient thereon;
 a memory in which a patient support apparatus ID is stored, the patient support apparatus ID identifying the patient support apparatus;
 a near field transceiver adapted to wirelessly communicate with a device using a near field communication protocol;
 a far field transceiver adapted to wirelessly communicate with the device using a far field communication protocol; and
 a controller adapted to transmit the patient support apparatus ID to the device using the near field communication protocol and to receive a device code from the device using the near field communication protocol, the controller further adapted to transmit a message to the device using the far field communication protocol, the message including both the patient support apparatus ID and the device code.

8. The patient support apparatus of claim 7 wherein the controller is further adapted to periodically verify that the near field transceiver is still in communication with the device and to terminate using the far field communication protocol with the device if the controller is unable to verify that the near field transceiver is still in communication with the device.

9. The patient support apparatus of claim 8 further including:
a plurality of wheels coupled to the base;
a height adjustment mechanism for raising and lowering said patient support deck with respect to said base; and
a plurality of siderails positioned along respective sides of said patient support deck, said siderails being movable between a raised and a lowered position.

10. The patient support apparatus of claim 9 wherein the device is one of an inflatable mattress adapted to lie on the patient support deck, a removable footboard adapted to be coupled and uncoupled from the patient support apparatus, a pump adapted to be used for treatment of the patient supported on the patient support apparatus, a ventilator adapted to be used for treatment of the patient supported on the patient support apparatus, and a portable computer.

11. The patient support apparatus of claim 9 wherein the controller is adapted to ignore messages received via the far field communication protocol that do not include the device code.

12. The patient support apparatus of claim 9 wherein the controller is further adapted to forward information contained within a message received from the device to a computer network, the controller forwarding the information using a third transceiver.

13. The patient support apparatus of claim 9 wherein the device is a portable computer executing a software application adapted to allow to use the portable computer to control an aspect of the patient support apparatus.

14. The patient support apparatus of claim 13 wherein the software application is configured to display a control panel image on a screen of the portable computer, the control panel image enabling a user to control the patient support apparatus.

15. The patient support apparatus of claim 9 wherein the far field communication protocol has a higher data rate than the near field communication protocol.

16. A patient support apparatus comprising:
a base;
a frame supported on said base;
a patient support deck adapted to support a patient thereon;
a memory in which a patient support apparatus ID is stored, the patient support apparatus ID identifying the patient support apparatus;
a near field transceiver adapted to wirelessly communicate with a mattress positioned on the patient support deck using a near field communication protocol;
a far field transceiver adapted to wirelessly communicate with the mattress using a far field communication protocol;
an inductive power coil adapted to wirelessly supply electrical power to the mattress; and
a controller adapted to transmit the patient support apparatus ID to the mattress using the near field communication protocol and to receive a code from the mattress using the near field communication protocol, the controller further adapted to transmit a message to the mattress using the far field communication protocol, the message including both the patient support apparatus ID and the code.

17. The patient support apparatus of claim 16 wherein the near field transceiver uses the inductive power coil to communicate using the near field communication protocol.

18. The patient support apparatus of claim 16 wherein the controller is further adapted to periodically verify that the near field transceiver is still in communication with the mattress and to terminate using the far field communication protocol with the mattress if the controller is unable to verify that the near field transceiver is still in communication with the mattress.

19. The patient support apparatus of claim 18 further including:
a plurality of wheels coupled to the base;
a height adjustment mechanism for raising and lowering said patient support deck with respect to said base; and
a plurality of siderails positioned along respective sides of said patient support deck, said siderails being movable between a raised and a lowered position.

20. The patient support apparatus of claim 19 wherein the controller is adapted to ignore messages received via the far field communication protocol that do not include the code.

21. The patient support apparatus of claim 19 wherein the controller is further adapted to forward information contained within the message received from the mattress to a computer network, the controller forwarding the information using a third transceiver.

* * * * *